US012003059B2

(12) United States Patent
Anderson et al.

(10) Patent No.: US 12,003,059 B2
(45) Date of Patent: Jun. 4, 2024

(54) MODULAR TELECOMMUNICATIONS PLUG AND METHOD

(71) Applicant: COMMSCOPE TECHNOLOGIES LLC, Hickory, NC (US)

(72) Inventors: Timothy W. Anderson, Omaha, NE (US); Jeffrey Allan Oberski, Lucas, TX (US); Brian J. Fitzpatrick, McKinney, TX (US); Shawn Phillip Tobey, Trinity, TX (US)

(73) Assignee: CommScope Technologies LLC, Hickory, NC (US)

( * ) Notice: Subject to any disclaimer, the term of this patent is extended or adjusted under 35 U.S.C. 154(b) by 273 days.

(21) Appl. No.: 17/298,224

(22) PCT Filed: Nov. 27, 2019

(86) PCT No.: PCT/US2019/063635
§ 371 (c)(1),
(2) Date: May 28, 2021

(87) PCT Pub. No.: WO2020/113023
PCT Pub. Date: Jun. 4, 2020

(65) Prior Publication Data

US 2022/0115807 A1 Apr. 14, 2022

Related U.S. Application Data

(60) Provisional application No. 62/773,825, filed on Nov. 30, 2018.

(51) Int. Cl.
*H01R 13/58* (2006.01)
*H01R 13/506* (2006.01)
(Continued)

(52) U.S. Cl.
CPC ......... *H01R 13/582* (2013.01); *H01R 13/506* (2013.01); *H01R 43/048* (2013.01);
(Continued)

(58) Field of Classification Search
None
See application file for complete search history.

(56) References Cited

U.S. PATENT DOCUMENTS 5,888,100 A 3/1999 Bofill et al.
5,899,770 A 5/1999 Ezawa
(Continued)

FOREIGN PATENT DOCUMENTS

CN 1131828 A 9/1996
EP 1 014 498 A2 6/2000
(Continued)

OTHER PUBLICATIONS

Extended European Search Report for Application No. 19890657.0 dated Jun. 30, 2022.
(Continued)

*Primary Examiner* — Oscar C Jimenez
(74) *Attorney, Agent, or Firm* — Merchant & Gould P.C.

(57) ABSTRACT

A modular plug is disclosed as having a housing, a wire manager, an anti-snag protector, and a load bar each configured to snap-fit together to assemble the modular plug. The wire manager includes a front portion fitted within an internal cavity of the housing and a rear portion having an aperture configured to receive a terminal end of a telecommunications cable. The wire manager includes a plurality of channels, each channel having a gate configured to position a twisted pair of wires from the telecommunications cable in a stacked vertical arrangement.

26 Claims, 26 Drawing Sheets

(51) Int. Cl.

| | |
|---|---|
| ***H01R 13/6463*** | (2011.01) |
| ***H01R 24/64*** | (2011.01) |
| ***H01R 43/048*** | (2006.01) |
| ***H01R 107/00*** | (2006.01) |

(52) U.S. Cl.

CPC .......... *H01R 13/6463* (2013.01); *H01R 24/64* (2013.01); *H01R 2107/00* (2013.01)

(56) References Cited

U.S. PATENT DOCUMENTS

| | | | | |
|---|---|---|---|---|
| 5,989,071 | A * | 11/1999 | Larsen ............... | H01R 13/6467 439/418 |
| 6,056,586 | A | 5/2000 | Lin | |
| 6,109,954 | A | 8/2000 | Lin | |
| 6,238,231 | B1 | 5/2001 | Chapman et al. | |
| 6,250,949 | B1 | 6/2001 | Lin | |
| 6,280,232 | B1 | 8/2001 | Beecher et al. | |
| 6,358,092 | B1 | 3/2002 | Siemon et al. | |
| 6,402,559 | B1 | 6/2002 | Marowsky et al. | |
| 6,409,535 | B1 | 6/2002 | Marowsky et al. | |
| 6,506,077 | B2 | 1/2003 | Nagel et al. | |
| 6,565,262 | B2 | 5/2003 | Childers et al. | |
| 6,579,116 | B2 | 6/2003 | Brennan et al. | |
| 6,729,901 | B2 | 5/2004 | Aekins | |
| 6,811,445 | B2 | 11/2004 | Caveney et al. | |
| 7,018,241 | B2 | 3/2006 | Caveney et al. | |
| 7,168,994 | B2 | 1/2007 | Caveney et al. | |
| 7,175,468 | B1 * | 2/2007 | Chang .................... | H01R 24/64 439/418 |
| 7,220,149 | B2 | 5/2007 | Pharney | |
| 7,223,112 | B2 | 5/2007 | AbuGhazaleh et al. | |
| 7,294,012 | B2 | 11/2007 | AbuGhazaleh et al. | |
| 7,374,450 | B1 | 5/2008 | Chang | |
| 7,384,298 | B2 | 6/2008 | Caveney et al. | |
| 7,404,739 | B2 | 7/2008 | Shields et al. | |
| 7,438,583 | B2 | 10/2008 | AbuGhazaleh et al. | |
| 7,556,536 | B2 | 7/2009 | Caveney et al. | |
| 7,621,772 | B1 | 11/2009 | Tobey | |
| 7,874,865 | B2 | 1/2011 | Tobey | |
| 7,972,183 | B1 | 7/2011 | Lin | |
| 8,277,260 | B2 | 10/2012 | Caveney et al. | |
| 8,348,702 | B2 | 1/2013 | Lin | |
| 8,702,453 | B2 | 4/2014 | Caveney et al. | |
| 9,054,440 | B2 | 6/2015 | Taylor et al. | |
| 9,214,759 | B2 | 12/2015 | Mattson et al. | |
| 9,413,154 | B2 | 8/2016 | Taylor et al. | |
| 9,448,370 | B2 | 9/2016 | Xue et al. | |
| 10,411,398 | B2 | 9/2019 | Pepe et al. | |
| 11,158,980 | B2 | 10/2021 | Anderson et al. | |
| 2002/0048990 | A1 | 4/2002 | Marowsky et al. | |
| 2002/0142644 | A1 | 10/2002 | Aekins | |
| 2004/0002252 | A1 * | 1/2004 | Hirokawa .......... | H01R 13/6463 439/418 |
| 2005/0106929 | A1 | 5/2005 | Meckley et al. | |
| 2006/0189200 | A1 | 8/2006 | Ma | |
| 2011/0053431 | A1 | 3/2011 | Bopp et al. | |
| 2012/0088412 | A1 | 4/2012 | Mattson et al. | |
| 2012/0315786 | A1 | 12/2012 | Lin | |
| 2013/0052860 | A1 | 2/2013 | Caveney et al. | |
| 2013/0157500 | A1 | 6/2013 | Mattson et al. | |
| 2015/0207283 | A1 | 7/2015 | Guitard et al. | |
| 2015/0295350 | A1 | 10/2015 | Bragg | |
| 2015/0340823 | A1 | 11/2015 | Stanislaw et al. | |
| 2016/0036179 | A1 | 2/2016 | Bragg et al. | |
| 2018/0226743 | A1 | 8/2018 | Pepe et al. | |
| 2018/0226753 | A1 | 8/2018 | Patel | |
| 2020/0176932 | A1 * | 6/2020 | Anderson .......... | H01R 13/6463 |

FOREIGN PATENT DOCUMENTS

| | | | |
|---|---|---|---|
| EP | 1 188 204 | B1 | 8/2008 |
| WO | 2005/048412 | A1 | 5/2005 |
| WO | 2017/027722 | A1 | 2/2017 |

OTHER PUBLICATIONS

International Search Report and Written Opinion of the International Searching Authority for International Patent Application No. PCT/US2019/063635 dated Mar. 27, 2020, 12 pages.

* cited by examiner

MODULAR TELECOMMUNICATIONS PLUG AND METHOD

CROSS-REFERENCE TO RELATED APPLICATION

This application is a National Stage Application of PCT/US2019/063635, filed on Nov. 27, 2019, which claims the benefit of U.S. Patent Application Ser. No. 62/773,825, filed on Nov. 30, 2018, the disclosures of which are incorporated herein by reference in their entireties. To the extent appropriate, a claim of priority is made to each of the above disclosed applications.

BACKGROUND

In the field of data communications, communications networks typically utilize telecommunications cable lines designed to maintain the integrity of signals being transmitted via the network. Telecommunications cable lines are typically connected into port or jack terminals using connector plugs that enable the cables to be easily connected and disconnected. The cable lines are typically comprised of twisted pairs of wires surrounded by a cable jacket. Quick connect cables are often constructed by securing a connector plug to the ends of the twisted wire pairs and sliding the connector plug into a matching port terminal where it locks into place with a simple lever lock. An RJ45 type connector is one example.

Crosstalk can negatively affect signal integrity in the telecommunications cable lines. Crosstalk is unbalanced noise caused by capacitive and/or inductive coupling between parallel wires. Furthermore, existing connector plug arrangements can be difficult to terminate in the field. For these and other reasons, improvements are desirable.

SUMMARY

One aspect relates to a modular plug for terminating a telecommunications cable. The modular plug includes a housing defining an internal cavity. A wire manager is fitted within the internal cavity of the housing. The wire manager includes a plurality of channels, each channel having a gate configured to position a twisted pair of wires from the telecommunications cable. A load bar is fitted within the internal cavity of the housing. The load bar defines an array of external grooves, each external groove being configured to receive a wire from each twisted pair of wires. The modular plug further includes a plurality of wire contacts that are aligned with the array of external grooves.

The load bar may include an internal cavity having a top surface and a bottom surface that converge into the array of external grooves. The top surface and the bottom surface each include a series of internal grooves that funnel into the array of external grooves.

Each gate on the wire manager may include opposing surfaces that diverge in opposite directions, the opposing surfaces being configured to guide a wire from each twisted pair of wires into the internal cavity of the load bar. The array of external grooves on the load bar are parallel and are arranged in the same vertical plane. In some examples, the load bar is configured to snap-fit onto the front portion of the wire manager. The load bar may include notches configured to latch onto corresponding notches on the front portion of the wire manager.

In one example, the gates are offset along the long axis of the wire manager. In another example, the wire manager defines three columns and two rows of channels. In certain examples, the front portion of the wire manager is tapered and is configured to pinch the twisted pairs of wires. The front portion of the wire manager may include tabs configured to snap-fit into corresponding slots on the housing.

In some examples, the wire manager includes a rear portion having an aperture configured to receive a terminal end of the telecommunications cable, the rear portion having a plurality of ribs that define orthogonal edges on exterior surfaces of the wire manager, and the orthogonal edges being configured to receive an anti-snag protector. The aperture on the rear portion of the wire manager may include a form factor configured to fit around the shape of the telecommunications cable, the form factor having ribs that define an internal circumference inside the aperture of the wire manager that is configured to grip a jacket of the telecommunications cable.

The housing may include an array of slots along a leading edge of a first end of the housing, each wire contact is received by a slot of the housing and is configured to electrically connect the twisted pairs of wires in the telecommunications cable to the contact springs of a telecommunications jack. The housing may further include a latching handle configured to secure the modular plug to a receptacle.

In some examples, the modular plug includes an anti-snag protector configured to attach to the wire manager, the anti-snag protector having an arm that extends from a base, the arm being configured to prevent the latching handle from being snagged. The base may include a depression configured to receive a form factor of the aperture on the rear portion of the wire manager. In some examples, the anti-snag protector is configured to snap-fit onto the rear portion of the wire manager. For example, the anti-snag protector includes sides each extending outwardly from the base and each having a latching member at a distal end, the sides being configured to flex around the rear portion of the wire manager and the latching members being configured to engage orthogonal edges on the rear portion of the wire manager.

The gates may have a smallest dimension that is less than twice the diameter of a single wire from each twisted pair of wires. In some examples, each gate is configured to hold a twisted pair of wires from the telecommunications cable in a stacked vertical arrangement.

In another aspect, the present disclosure relates to a telecommunications cable terminated by a modular plug in accordance with the aforementioned features.

In another aspect, a method of terminating a telecommunications cable with a modular plug comprises: attaching a wire manager to a terminal end of a telecommunications cable; using gates on the wire manager to hold twisted pairs of wires from the telecommunications cable; straightening the twisted pairs of wires; sliding a load bar onto the straightened wires; trimming the straightened wires to be flush with a distal end of the load bar; attaching a housing to the wire manager; and crimping wire contacts housed inside the housing to contact the wires.

In some examples, the method may further comprise attaching an anti-snag protector to the wire manager. Also, the method may further comprise trimming the wires to have a predetermined length that extends outside a front portion of the wire manager. Additionally, the method may further comprise attaching the load bar to the wire manager.

A variety of additional inventive aspects will be set forth in the description that follows. The inventive aspects can relate to individual features and to combinations of features.

It is to be understood that both the forgoing general description and the following detailed description are exemplary and explanatory only and are not restrictive of the broad inventive concepts upon which the examples disclosed herein are based.

DESCRIPTION OF THE FIGURES

The following drawing figures, which form a part of this application, are illustrative of described technology and are not meant to limit the scope of the disclosure in any manner.

DETAILED DESCRIPTION

Figure 1:
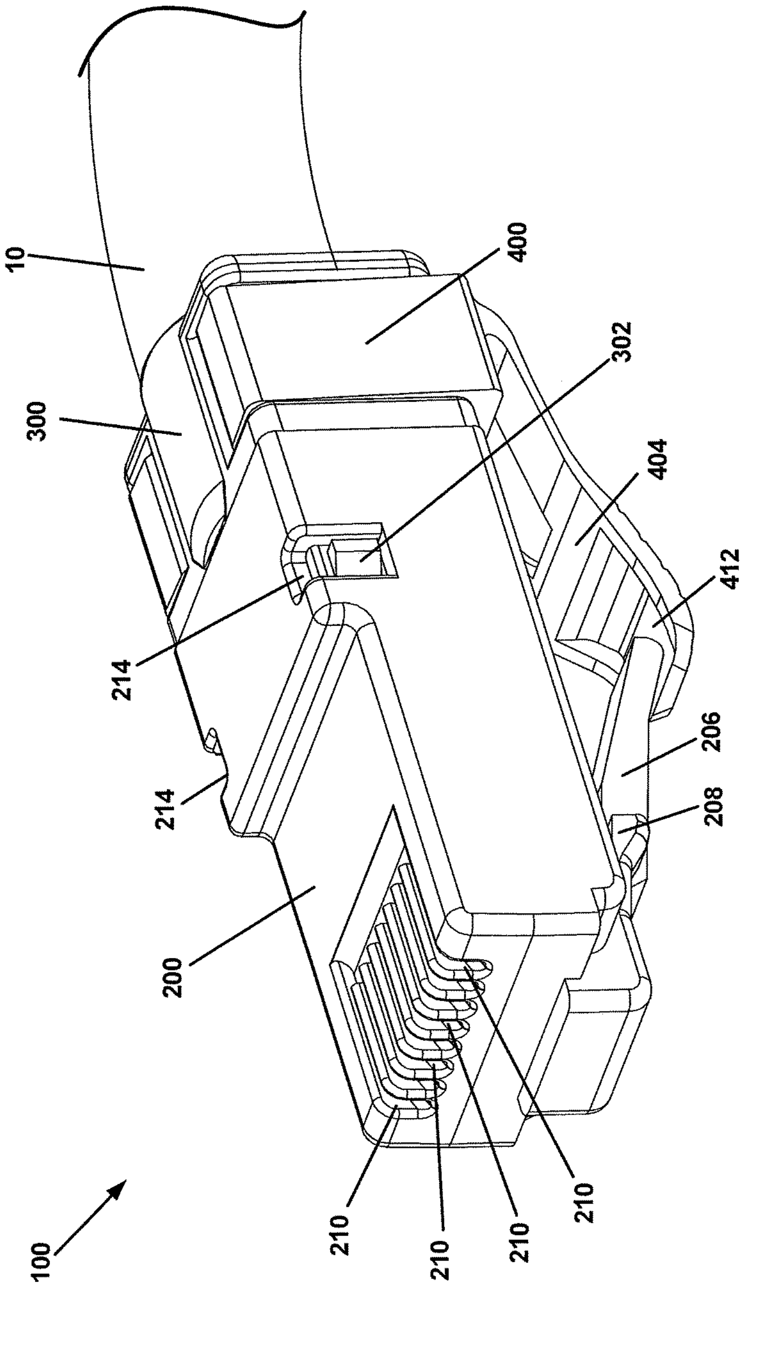
FIG. 1 is a perspective view of a telecommunications cable terminated by a modular plug.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 2:
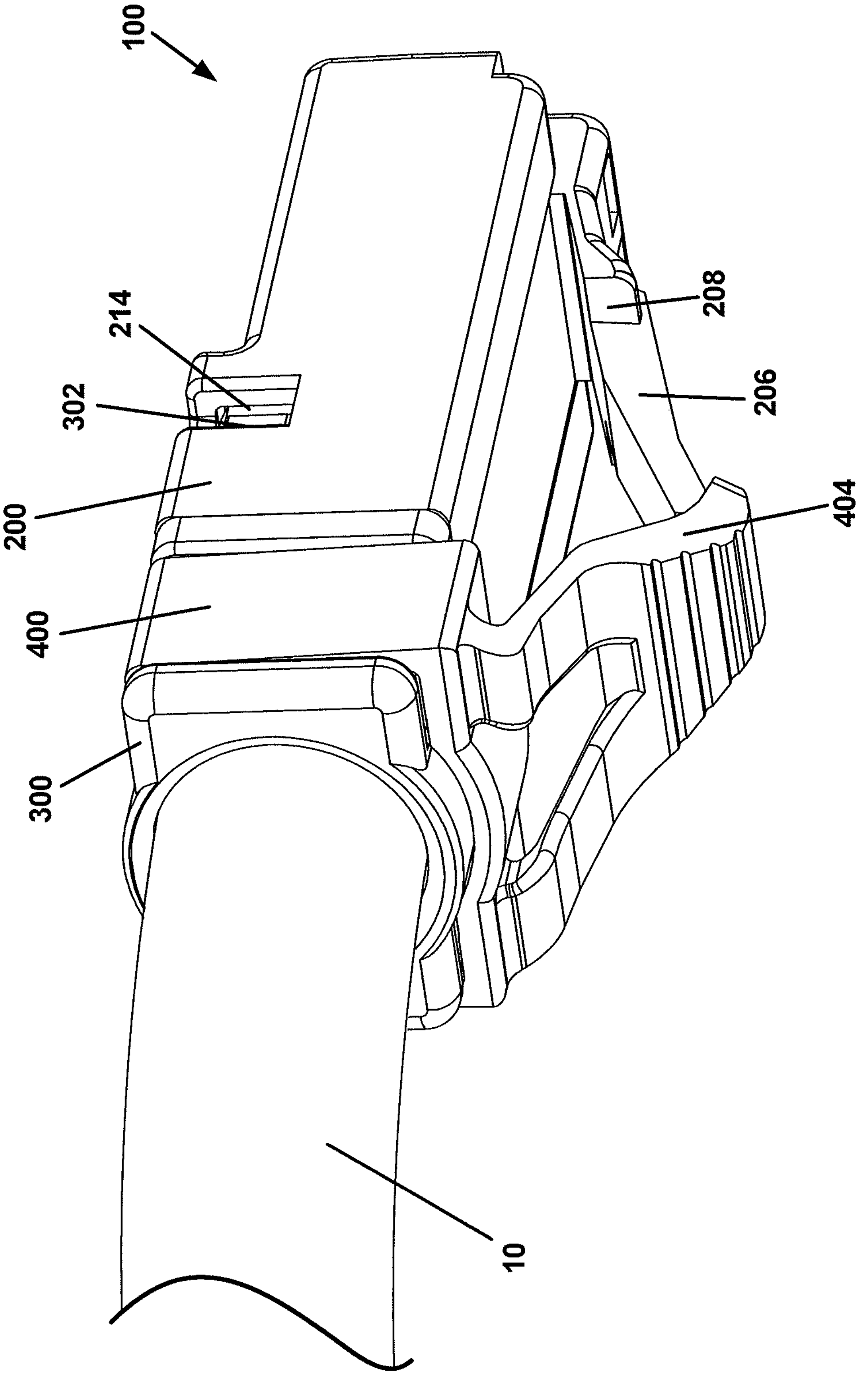
FIG. 2 is another perspective view of the telecommunications cable and modular plug.
Figure 3:
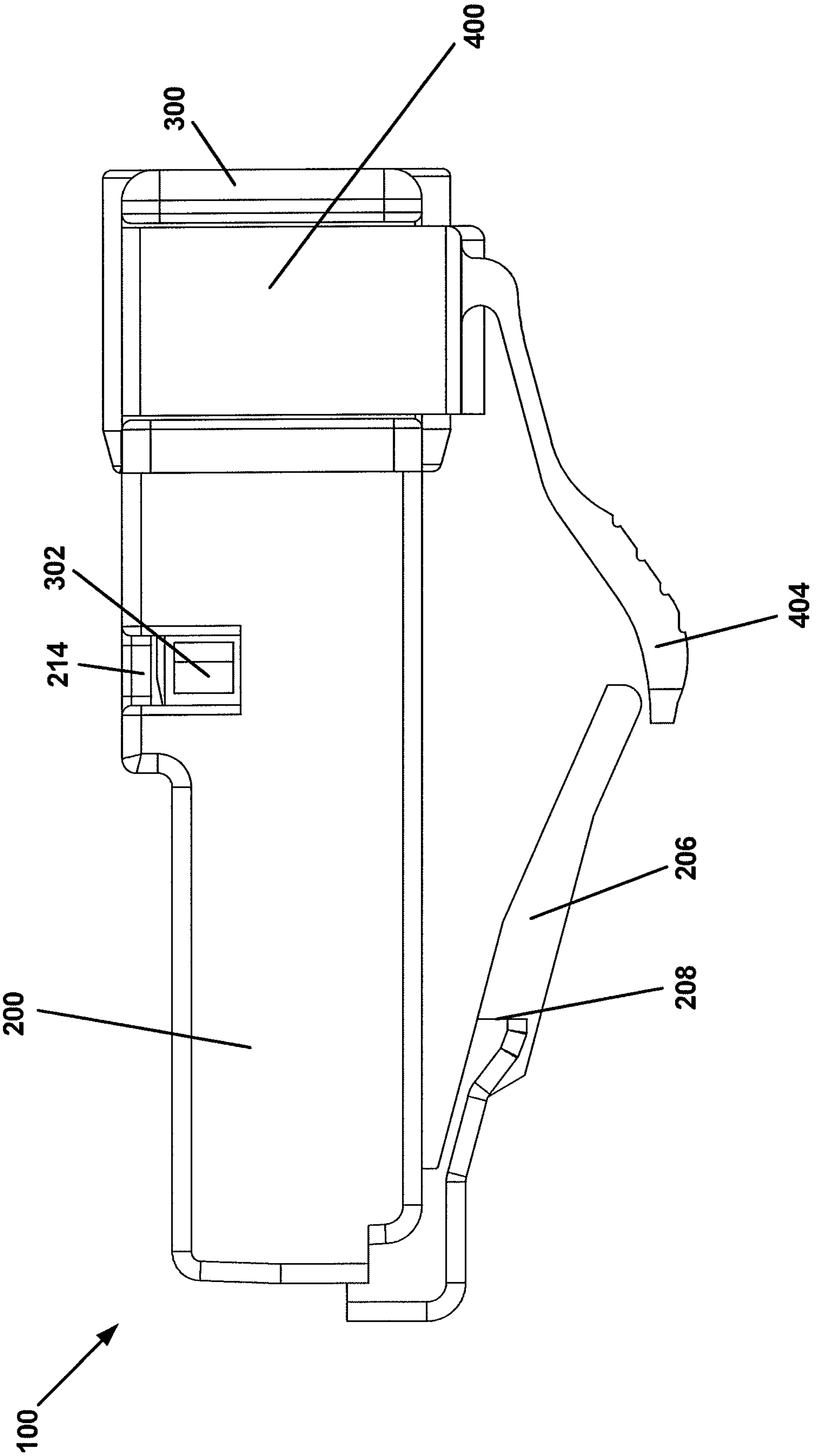
FIG. 3 is a right side view of the modular plug.
Figure 4:
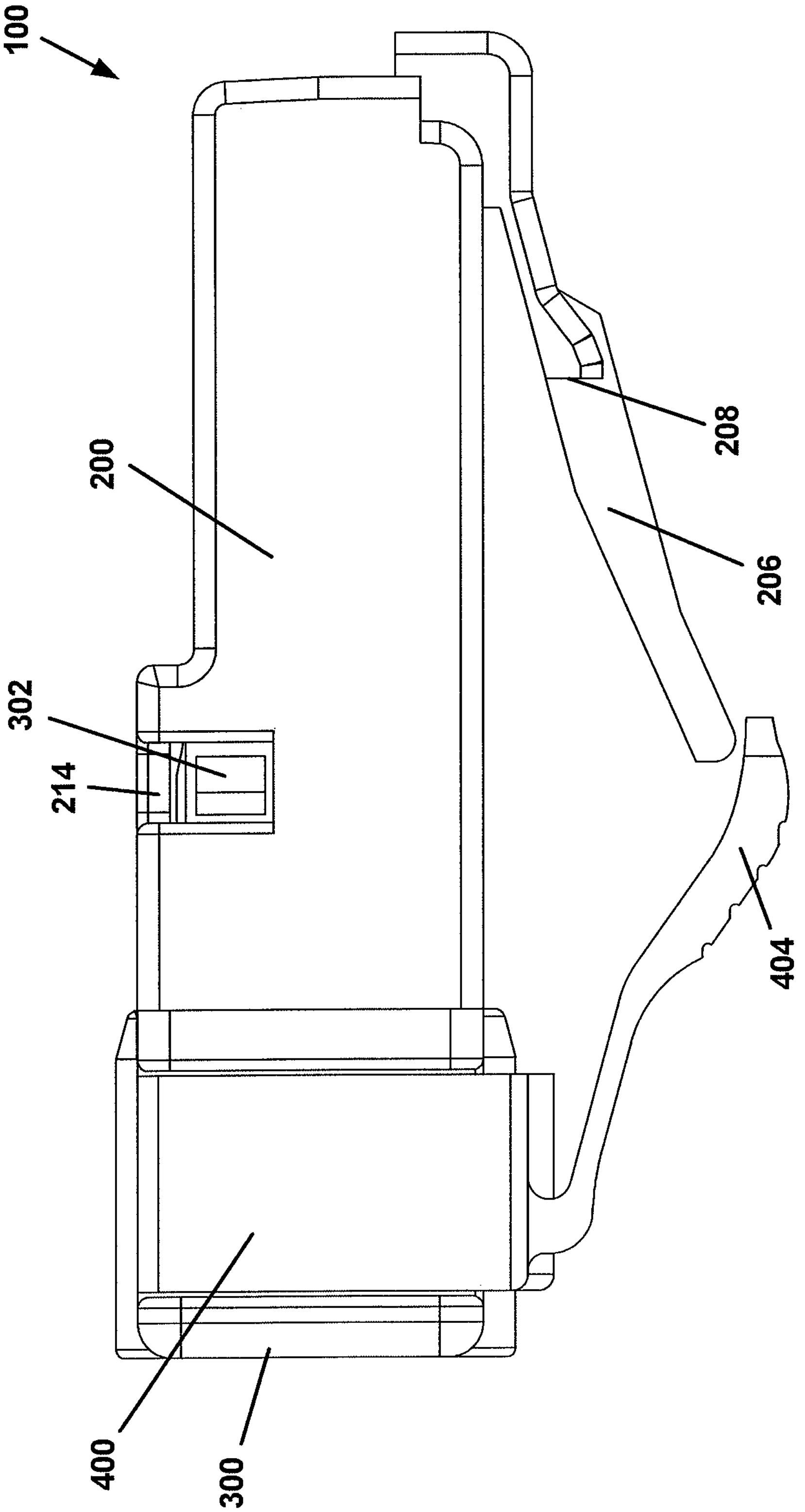
FIG. 4 is a left side view of the modular plug.
Figure 5:
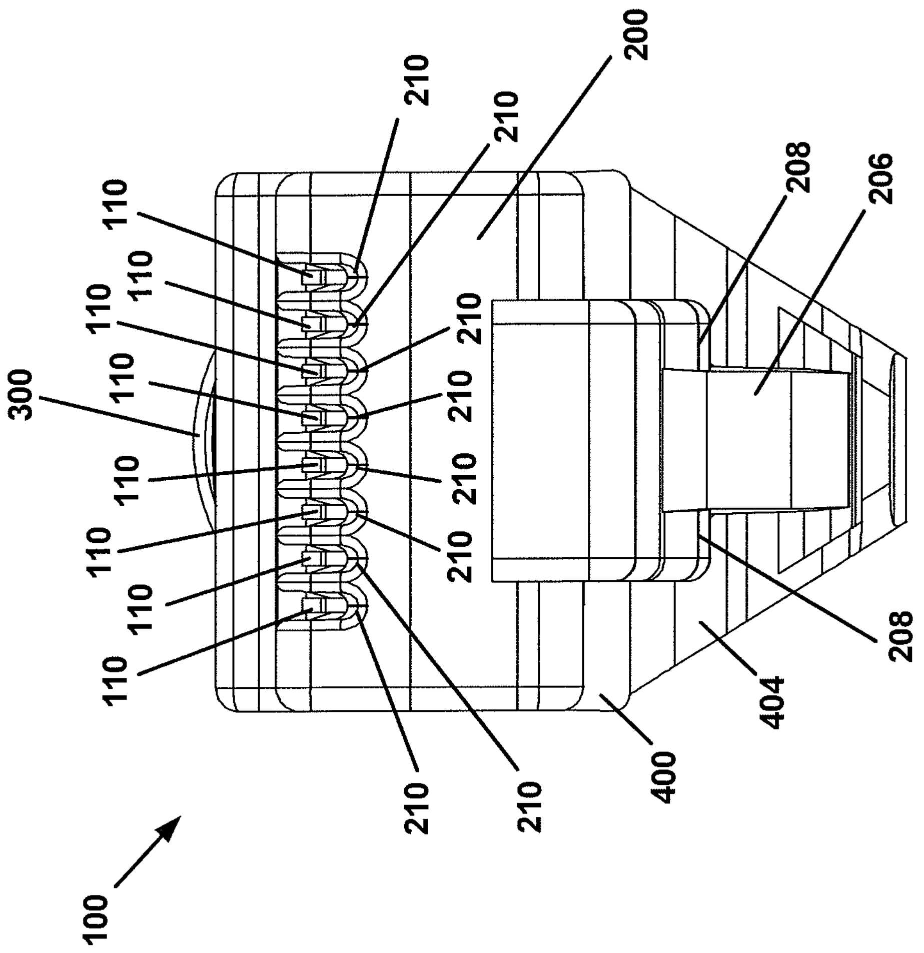
FIG. 5 is a front view of the modular plug.
Figure 6:
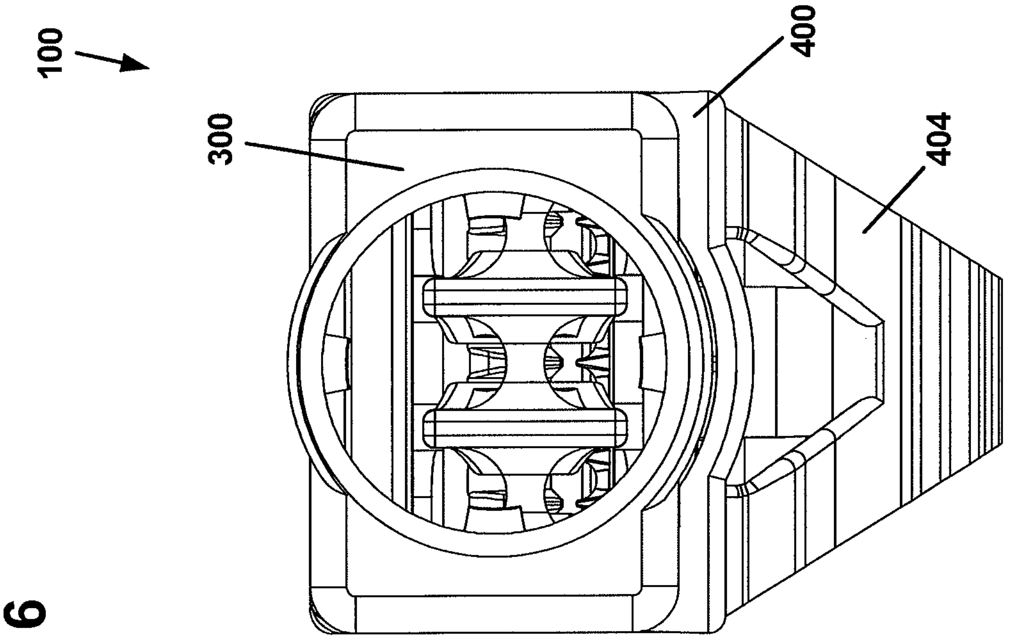
FIG. 6 is a rear view of the modular plug.
Figure 7:
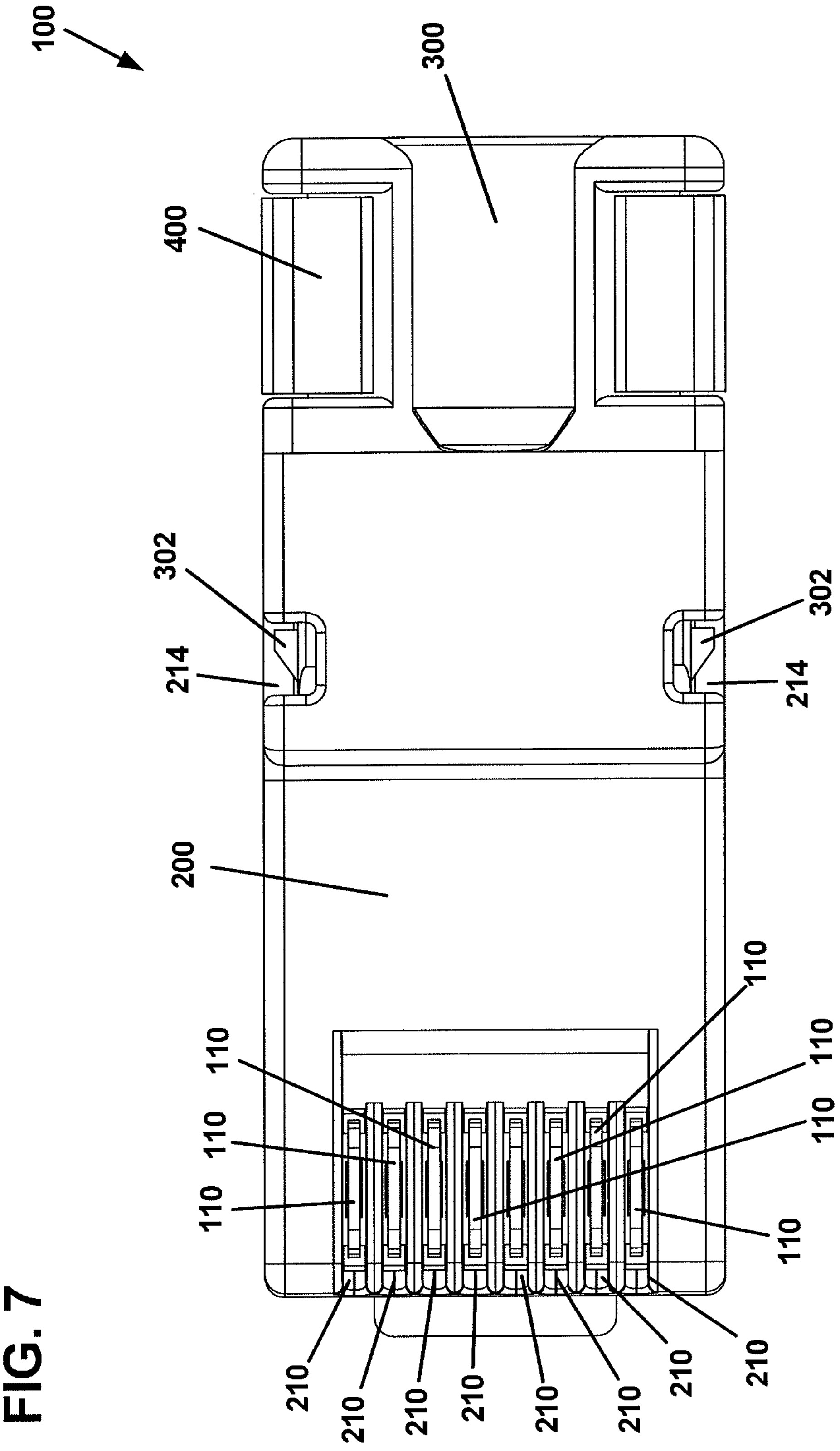
FIG. 7 is a top view of the modular plug.
Figure 8:
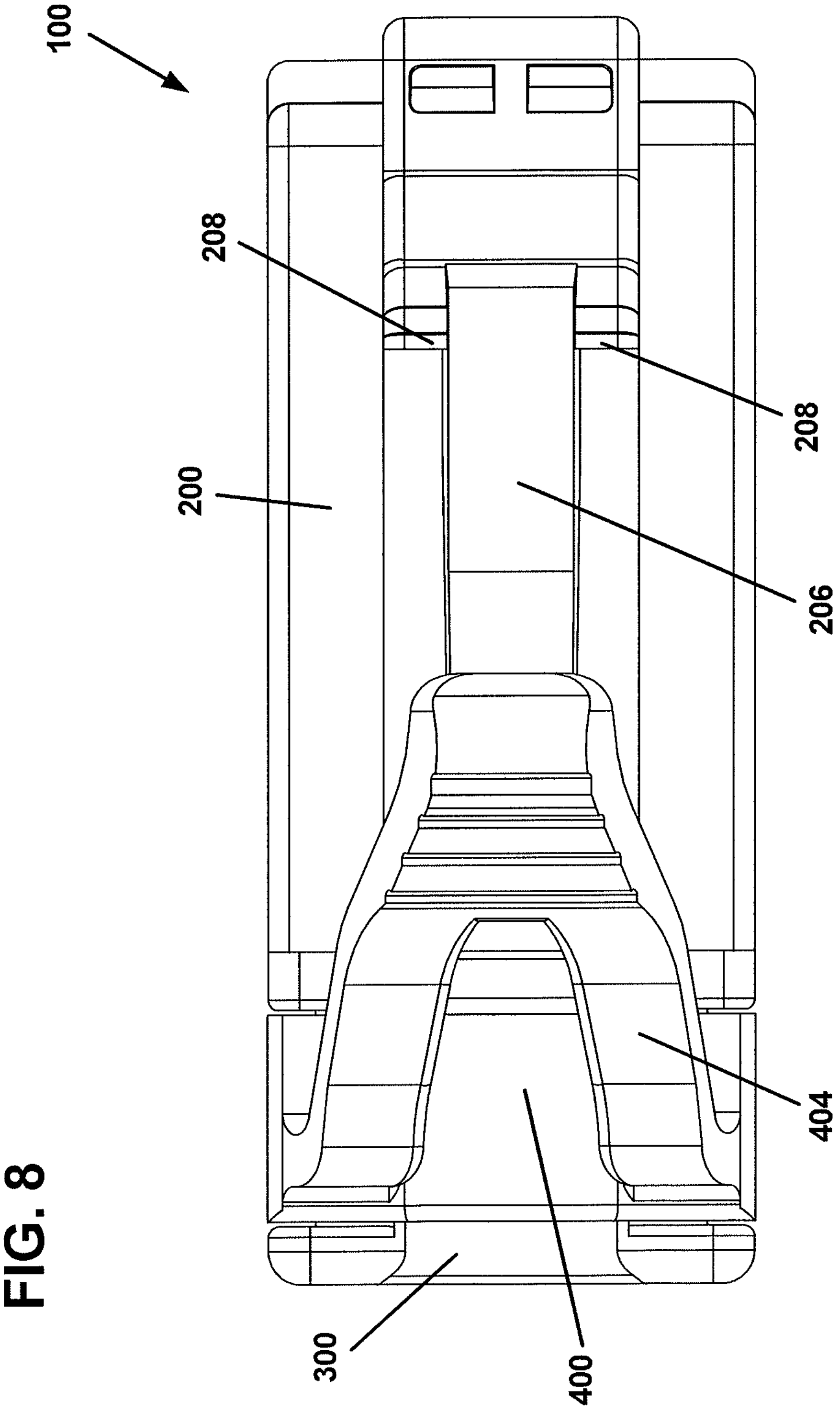
FIG. 8 is a bottom view of the modular plug.
Figure 9:
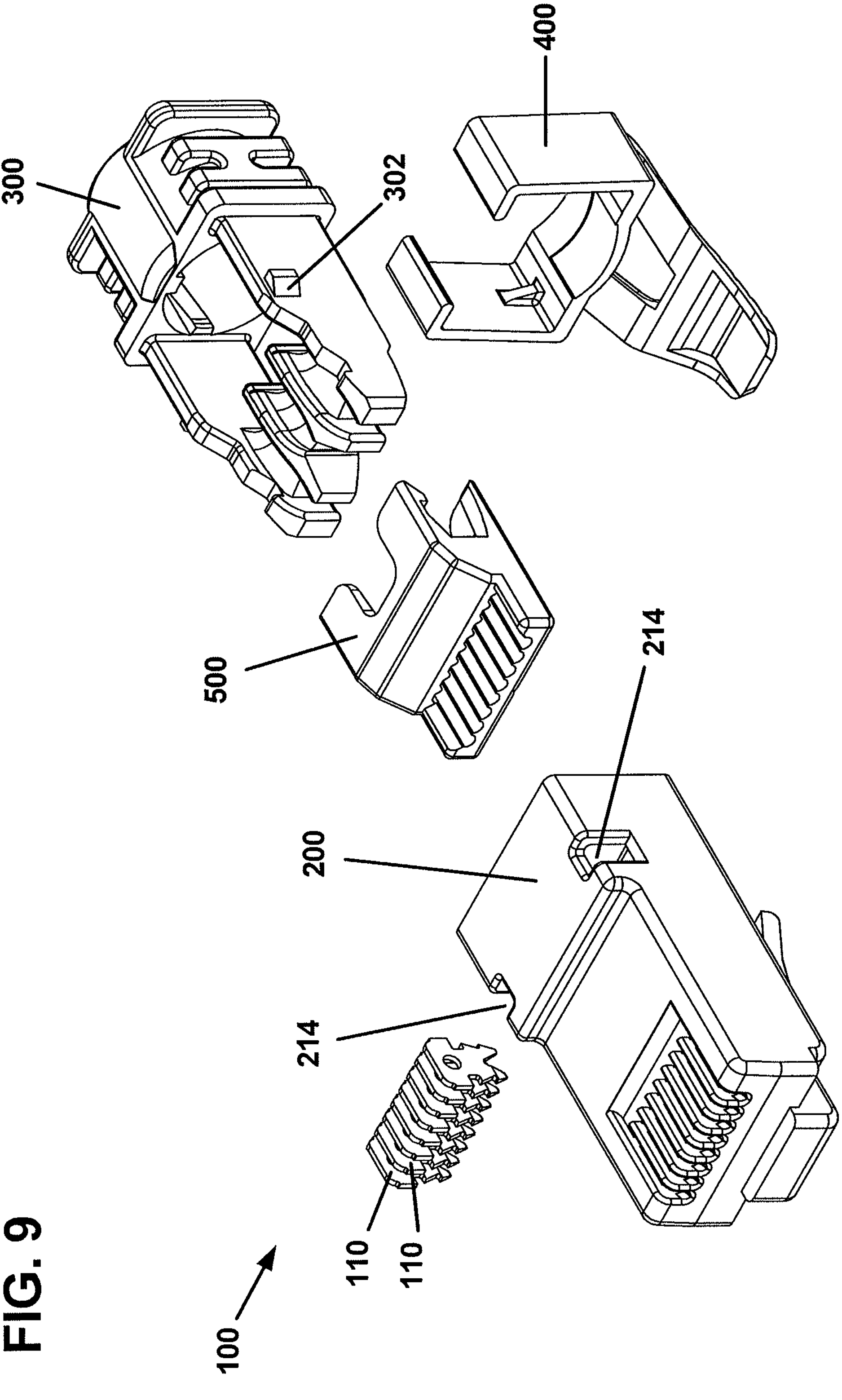
FIG. 9 is an exploded view of the modular plug.

FIGS. 1 and 2 are perspective views of a telecommunications cable 10 terminated by a modular plug 100. The telecommunications cable 10 includes twisted pairs of wires housed inside a protective outer jacket. The twisted pairs of wires are configured to transmit signals. For example, information such as video, audio, and data may be transmitted in the form of balanced signals over a pair of twisted wires. The transmitted signal is defined by the voltage difference between the wires. The telecommunications cable 10 includes four twisted pairs of wires.

As shown in FIGS. 1 and 2, the modular plug 100 is configured to terminate the telecommunications cable 10. In particular, the modular plug 100 is configured to terminate the twisted pairs of wires housed inside the jacket of the telecommunications cable 10.

FIGS. 3-9 depict right side, left side, front, rear, top, bottom, and exploded views, respectively, of the modular plug 100. As shown in FIGS. 3-9, the modular plug 100 includes a housing 200, a wire manager 300, an anti-snag protector 400, and a load bar 500 (see FIG. 9). As will be described in more detail, the housing 200, wire manager 300, anti-snag protector 400, and load bar 500 are configured to snap-fit together to assemble the modular plug 100.

Figure 10:
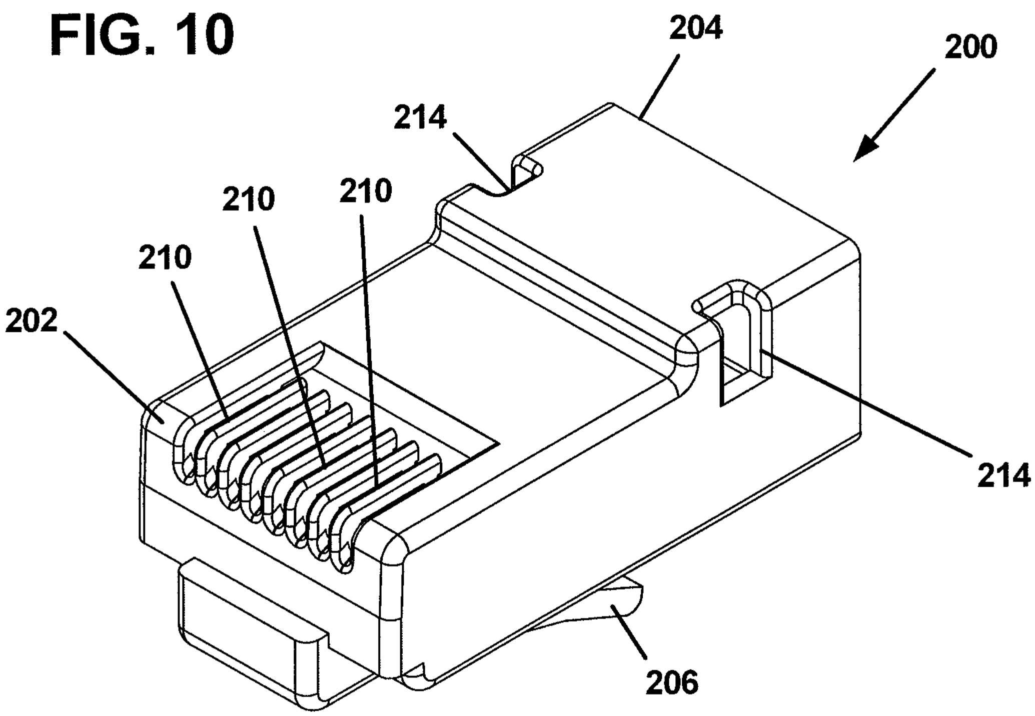
FIG. 10 is a front perspective view of a housing.
Figure 11:
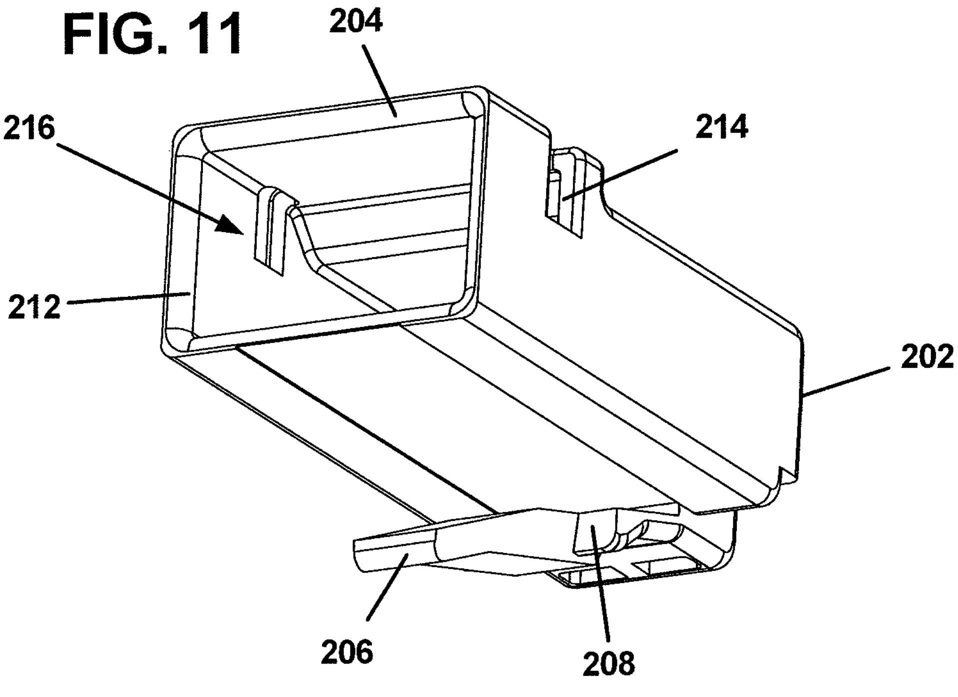
FIG. 11 is a rear perspective view of the housing.
Figure 12:
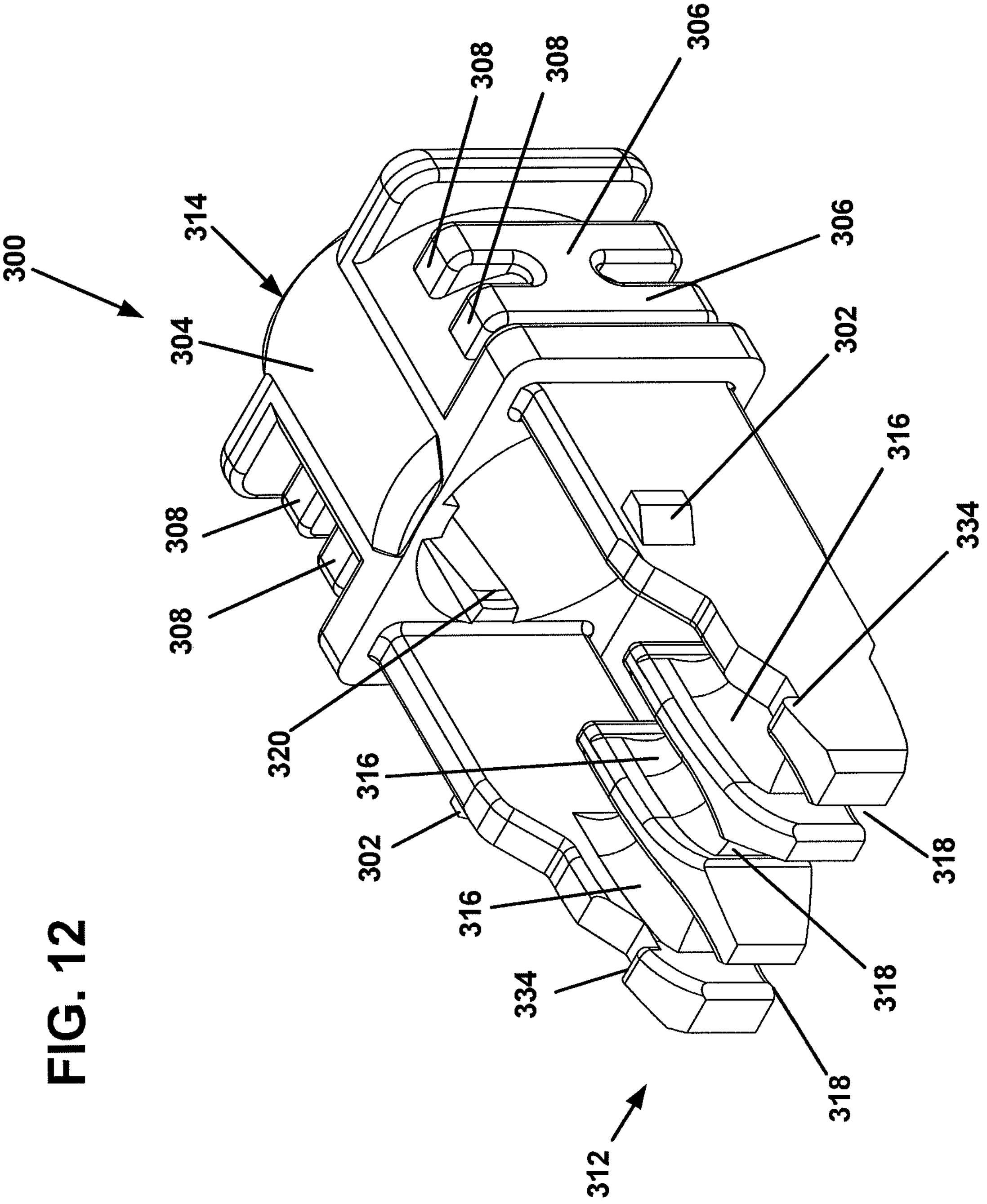
FIG. 12 is a perspective view of a wire manager.

FIGS. 10 and 11 are front and rear perspective views of the housing 200. As shown in FIGS. 10 and 11, the housing 200 extends from a first end 202 to a second end 204, and defines an internal cavity 216. The internal cavity 216 is configured to receive a front portion of the wire manager 300 as well as the twisted pairs of wires of the telecommunications cable 10.

As shown in FIGS. 10 and 11, the housing 200 further includes an array of slots 210 along a leading edge of the first end 202. As shown in FIGS. 1-9, the modular plug 100 includes a plurality of wire contacts 110 held by the housing 200. Each wire contact 110 is received by a slot 210 in the housing 200 and is configured to electrically connect the twisted pairs of wires in the telecommunications cable 10 to the contact springs of a telecommunications jack. A load bar 500 (see FIG. 9) is configured to align the wires with the wire contacts 110. In the example shown, eight wire contacts 110 and eight slots 210 are illustrated. Accordingly, the modular plug 100 may correspond to an RJ-45 jack. Other configurations are possible.

Referring now to FIGS. 10 and 11, the housing 200 includes a latching handle 206 having shoulders 208. The latching handle 206 and shoulders 208 are configured to secure the modular plug 100 to a receptacle such as a telecommunications jack.

As shown in FIGS. 10 and 11, the housing 200 at the second end 204 includes an aperture 212 that receives the wire manager 300. Furthermore, the housing 200 includes slots 214 on opposing sides that are configured to receive corresponding tabs 302 of the wire manager 300.

Figure 13:
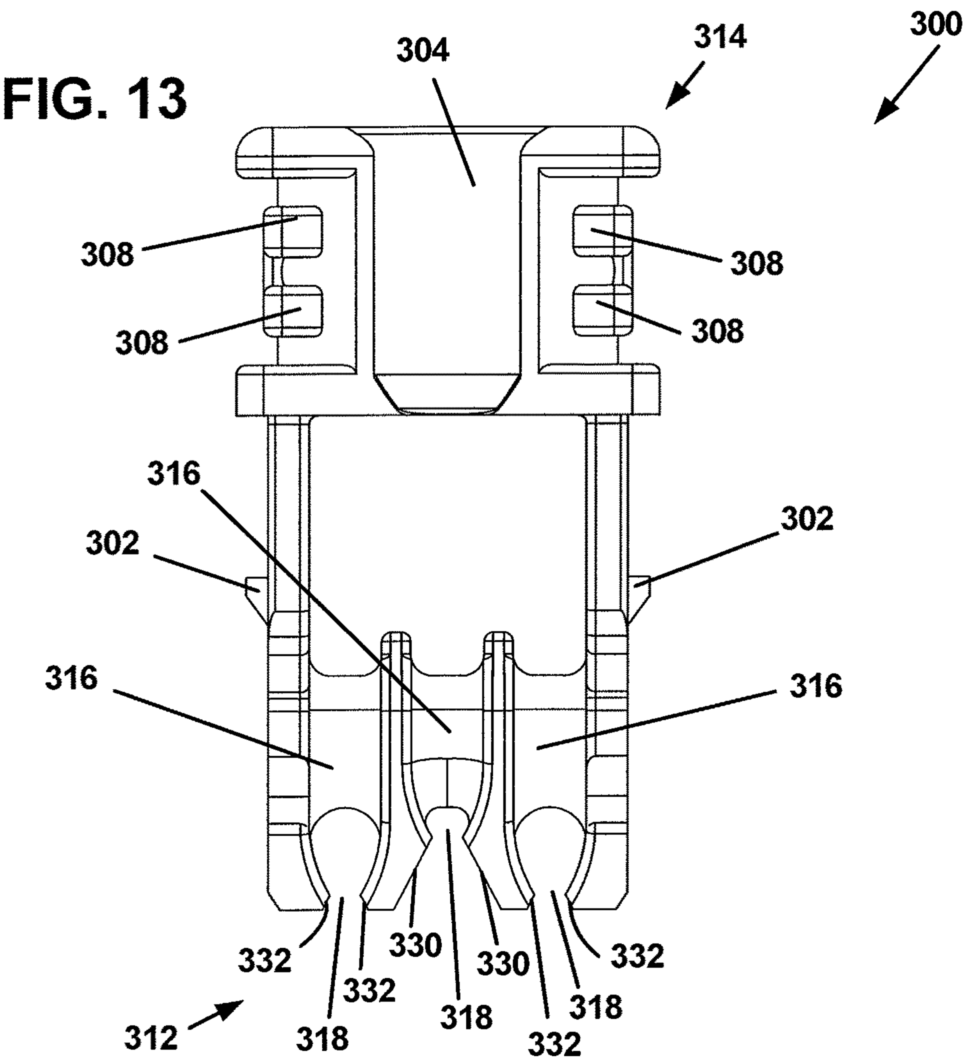
FIG. 13 is a top view of the wire manager.
Figure 14:
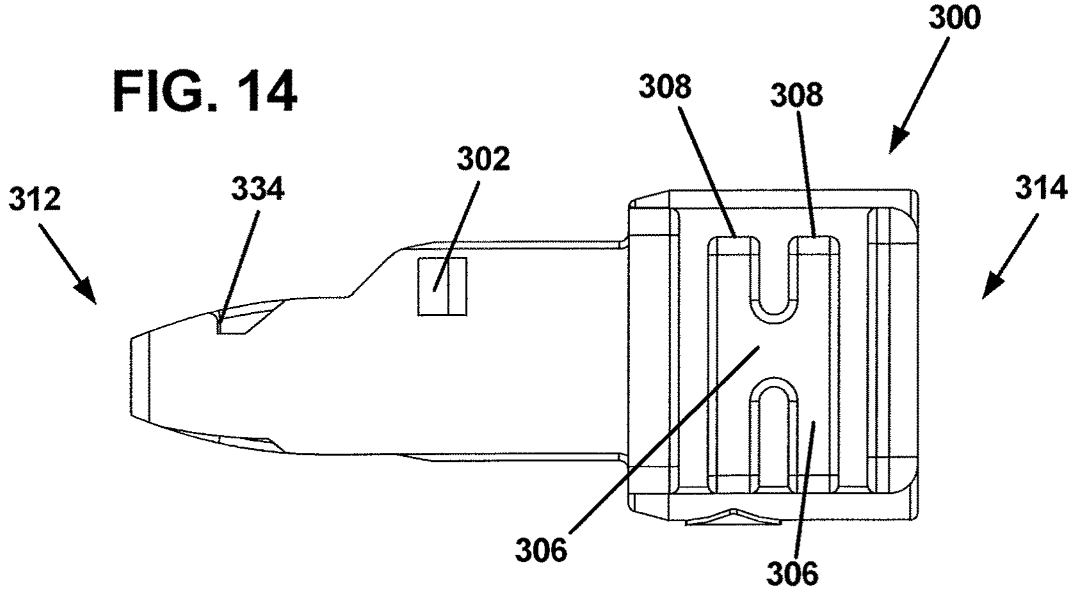
FIG. 14 is a side view of the wire manager.
Figure 15:
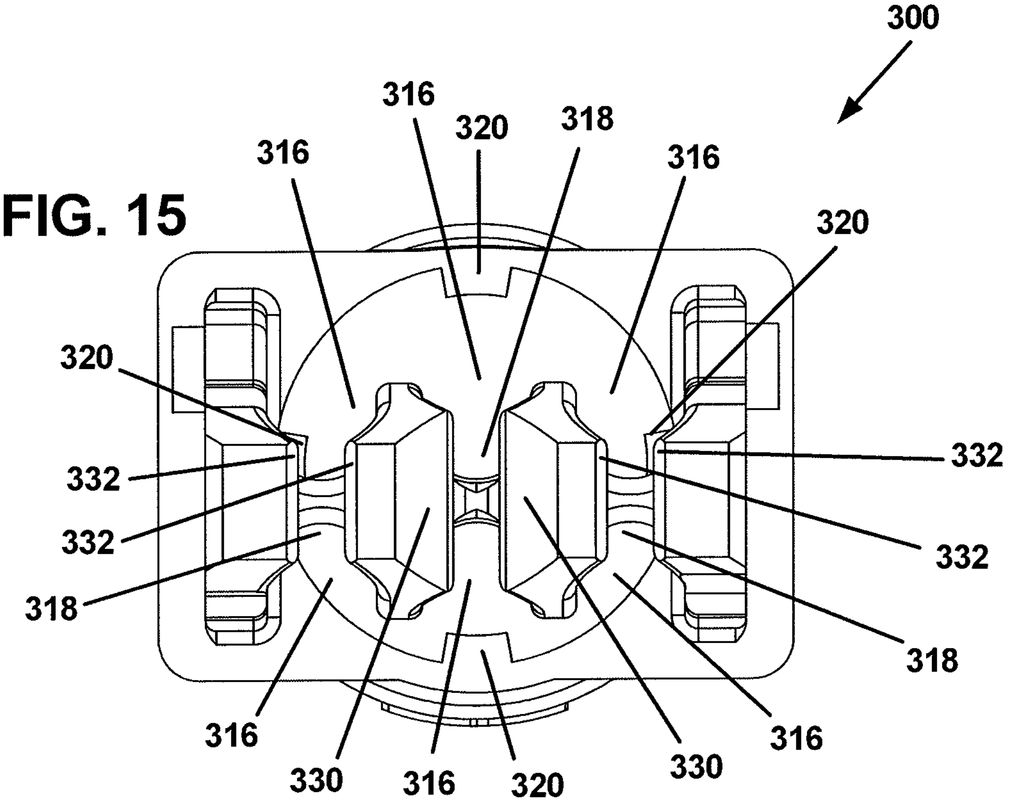
FIG. 15 is a front view of the wire manager.

FIGS. 12-16 are perspective, top, side, front, and rear views, respectively, of the wire manager 300. As shown in FIGS. 12-16, the wire manager 300 is fitted within the internal cavity 216 of the housing 200 when the modular plug 100 is assembled. As described above, the wire manager 300 includes tabs 302 that can fit into the slots 214 of the housing 200 such that the wire manager 300 can snap-fit onto the housing 200. Also, as shown in FIG. 14, the wire manager 300 includes notches 334 that are configured to receive corresponding notches 506 on the load bar 500. Accordingly, the load bar 500 is configured to snap-fit onto a front portion 312 of the wire manager 300.

Additionally, the rear portion 314 of the wire manager 300 includes a plurality of ribs 306 that define orthogonal edges 308 on exterior surfaces of the wire manager 300. The orthogonal edges 308 are configured to receive the anti-snag protector 400. As will be described in more detail, the anti-snag protector 400 is configured to snap-fit onto the wire manager 300.

The rear portion 314 of the wire manager 300 further includes an aperture 310 configured to receive a terminal end of the telecommunications cable 10. The aperture 310 includes a form factor 304 configured to fit around the shape of the telecommunications cable 10. For example, the form factor 304 can have a circular shape while the rear portion 314 of the wire manager 300 can have a substantially rectangular shape. Other configuration are possible.

Figure 16:
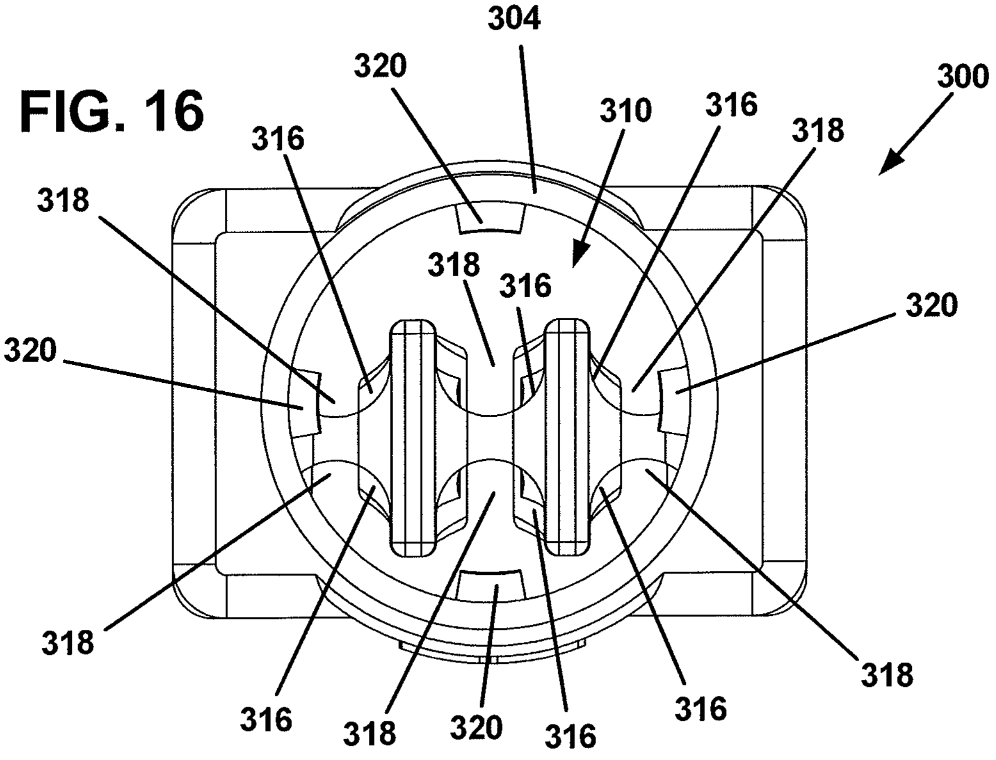
FIG. 16 is a rear view of the wire manager.
Figure 17:
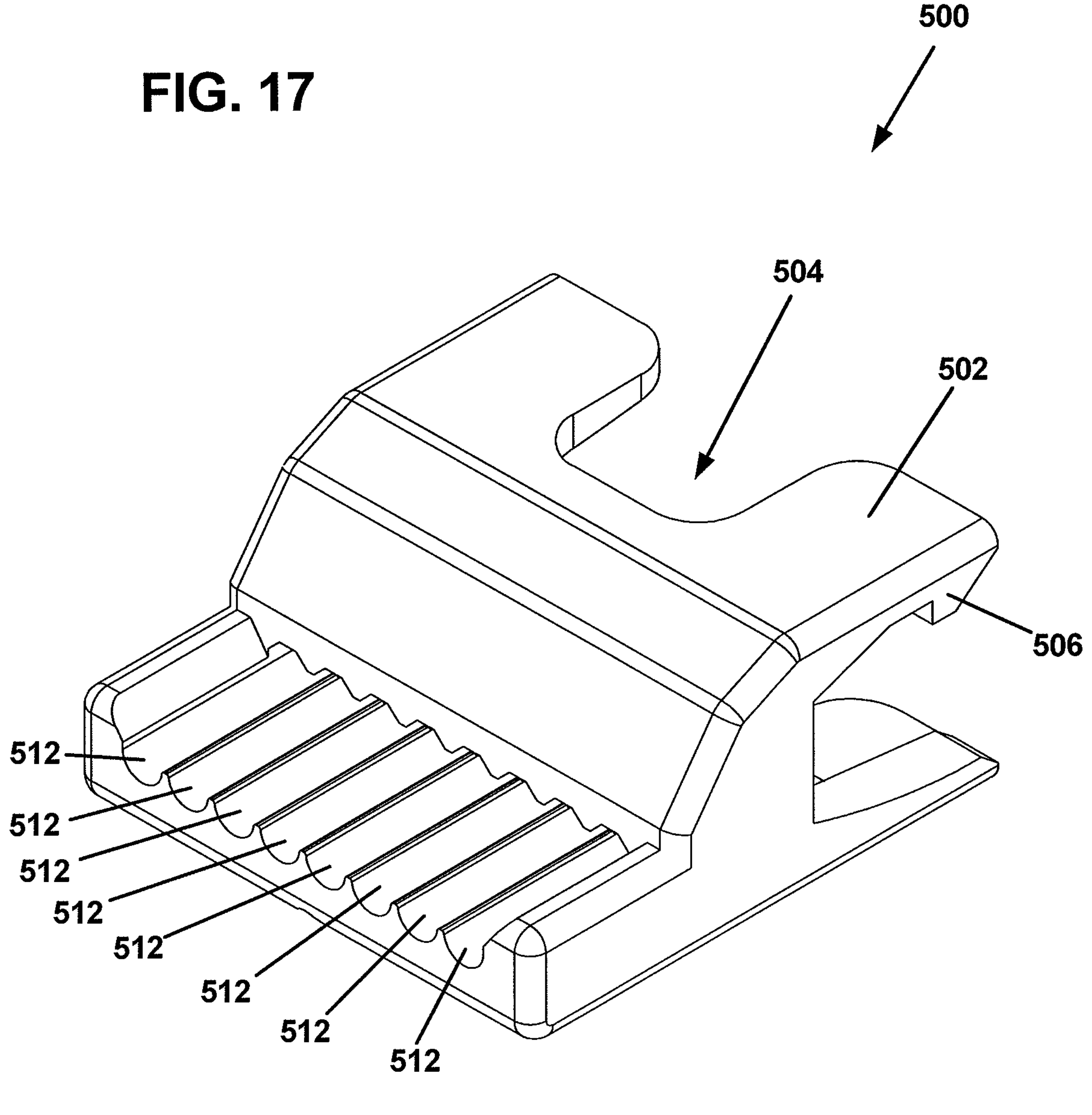
FIG. 17 is a perspective view of a load bar.
Figure 18:
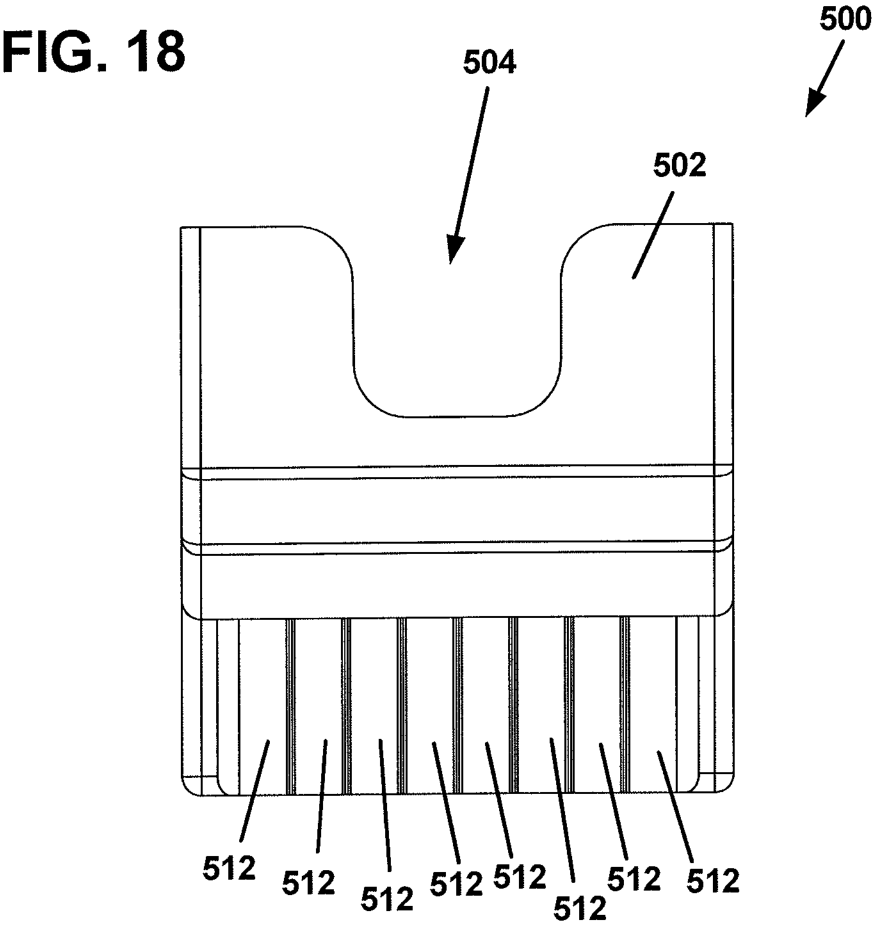
FIG. 18 is a top view of the load bar.
Figure 19:
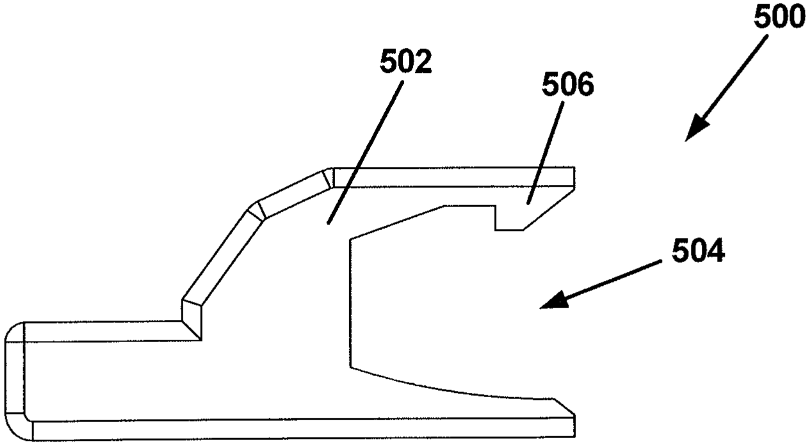
FIG. 19 is a side view of the load bar.
Figure 20:
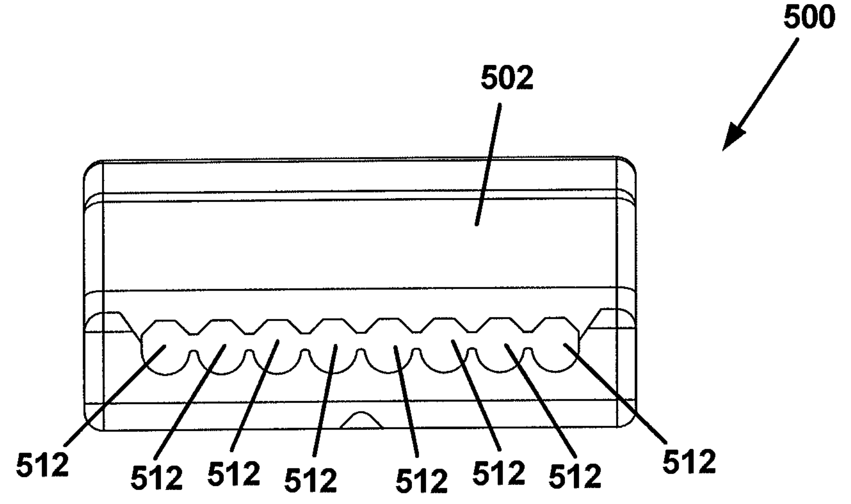
FIG. 20 is a front view of the load bar.
Figure 21:
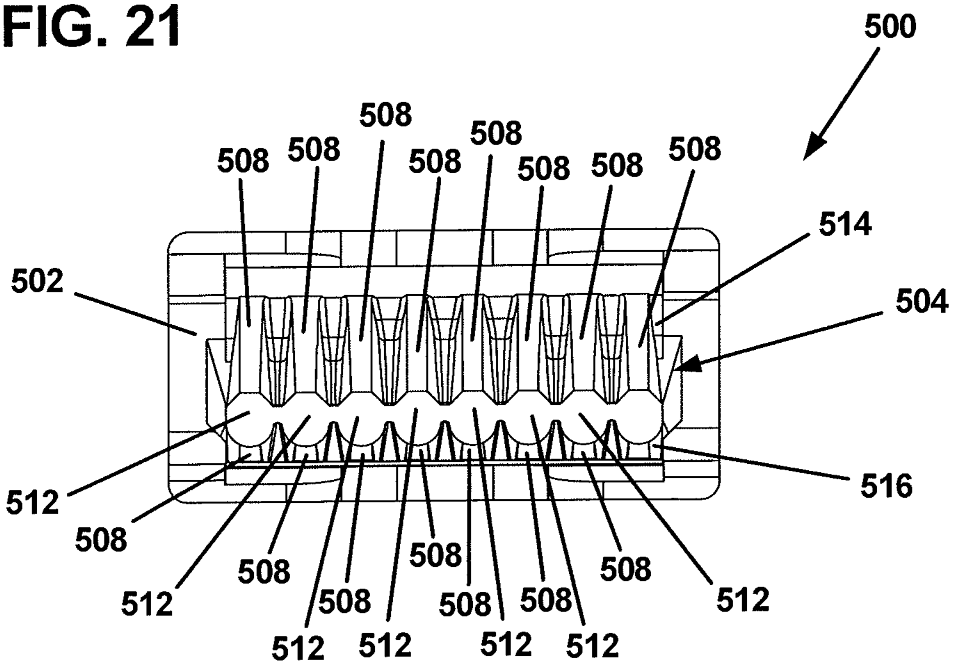
FIG. 21 is a rear view of the load bar.

As shown in FIG. 16, the form factor 304 includes ribs 320 that are positioned on an internal surface of the form factor 304. Each rib 320 has a sloped surface that extends from the rear portion 314 toward the front portion 312 of the wire manager 300. The ribs 320 define an internal circumference smaller than the outside circumference of the aperture 310. The smaller internal circumference of the ribs 320 is configured to grip the jacket of the telecommunications cable 10 when inserted through the aperture 310 of the wire manager 300.

When assembled, a portion of the jacket of the telecommunications cable 10 is stripped and the exposed twisted pairs of wires extend through the wire manager 300 before reaching the internal cavity 216 of the housing 200 and the array of wire contacts 110. The wire manager 300 includes a plurality of channels 316 that are equally spaced apart. Each channel 316 receives a twisted pair of wires. In the example shown, the wire manager 300 includes three columns and two rows of channels 316 such that the wire manager 300 includes six channels 316. For example, the wire manager 300 can include three vertical columns, an upper row, and a lower row of channels 316. As described above, the telecommunications cable 10 includes four twisted pairs of wires. Accordingly, when the telecommunications cable 10 is terminated by the modular plug 100, at least two channels 316 of the wire manager 300 remain empty and unused.

In alternative examples, the wire manager 300 can define a greater or lesser number of channels 316 as may be needed or desired for a particular application. For example, the wire manager 300 can define four, five, seven, or eight channels. Other configurations are possible.

As shown in FIGS. 12-16, each channel 316 includes a gate 318 positioned toward the front portion 312 of the wire manager 300. In certain examples, each channel 316 has a first width and each gate has a second width smaller than the first width.

Each gate 318 defines the smallest dimension of each channel 316 to be substantially similar to the diameter of a single wire from each twisted pair of wires. In some examples, each gate 318 has a smallest dimension that is less than twice the diameter of a single wire. In some further examples, each gate 318 has a smallest dimension that is equal to or less than the diameter of a single wire from each twisted pair of wires. Each gate 318 of the wire manager 300 positions a twisted pair of wires such that the wires are only able to pass through each gate 318 in a stacked arrangement. In some examples, each gate 318 has a height that is equal to or greater than the combined diameter of two wires positioned side by side. In some further examples, each gate 318 is sized and shaped to engage a twisted pair of wires on both sides of the twisted pair to hold the twisted pair of wires in a stacked vertical arrangement.

Advantageously, the gates 318 of the wire manager 300 maintain the twist and spacing between the twisted pairs of wires before the wires reach the load bar 500 and the wire contacts 110. By maintaining the twist and spacing, the wire manager 300 substantially reduces crosstalk between the wires inside the modular plug 100, and thus substantially improves the performance of the modular plug 100. Additionally, the gates 318 can hold the twisted pairs of wires making it easier for a technician to untwist the wires.

Figure 31:
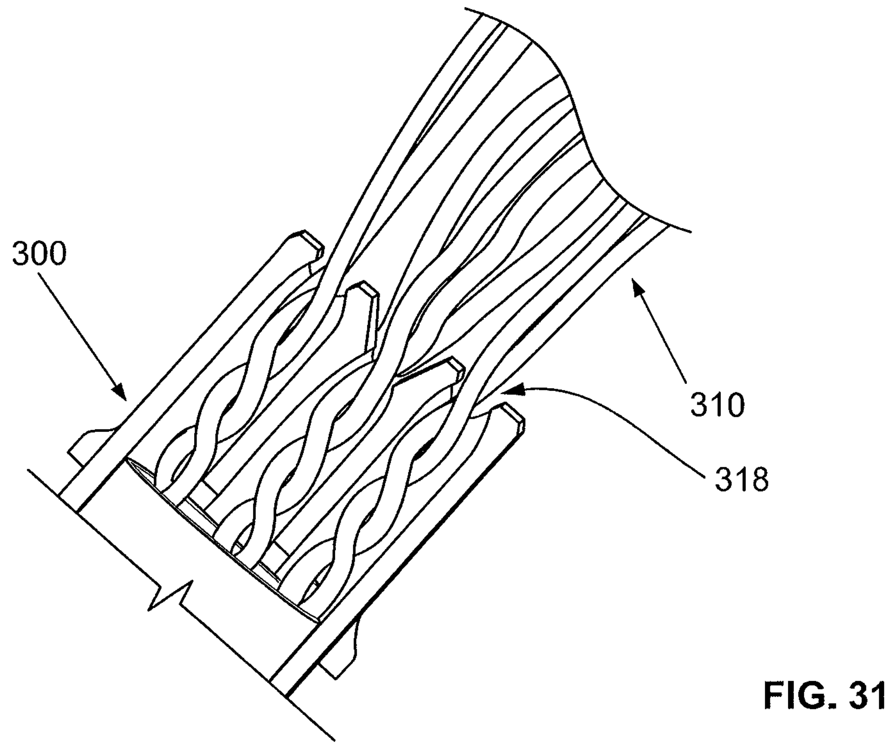
FIG. 31 shows the straightened wires exiting the gates of the wire manager.

Referring now to FIG. 13, the gates 318 are offset along the long axis of the wire manager 300 with some gates 318 in closer proximity to the distal end of the front portion 312 of the wire manager 300 than others. For example, the gates 318 on channels 316 on opposite sides of the wire manager 300 are in closer proximity to the distal end of the front portion 312 of the wire manager 300 than the gates 318 on a central channel 316. The offset of the gates 318 is advantageous because it provides extra space for a middle pair of twisted wires to go around an adjacent pair of twisted wires. For example, FIG. 31 illustrates a twisted pair of green and white wires that go around an adjacent pair of blue and white wires.

Still referring to FIG. 13, the gates 318 of the central column include opposing surfaces 330 that diverge in opposite directions. The opposing surfaces 330 are configured to guide wires from the twisted pairs of wires held by the gates 318 of the central column to the load bar 500. Similarly, the gates 318 of the side columns include opposing surfaces 332 that diverge in opposite directions, and that are configured to guide wires from the twisted pairs of wires held by the gates 318 of the side columns to the load bar 500.

Referring now to FIGS. 13 and 14, the front portion 312 of the wire manager 300 is tapered. The tapered shape of the front portion 312 makes it easier for a technician to pinch the front portion 312, and hence makes it easier for the technician to hold the wires in place while untwisting and arranging the wires into a linear arrangement.

FIGS. 17-21 are perspective, top, side, front, and rear views, respectively, of the load bar 500. The load bar 500 is sized and shaped to fit within the internal cavity 216 of the housing 200 when the modular plug 100 is assembled. As shown in FIGS. 17-21, the load bar 500 includes a body 502 that defines notches 506 that can latch onto the corresponding notches 334 of the wire manager such that the load bar 500 is configured to snap-fit onto the wire manager 300.

The body 502 defines an internal cavity 504 that includes a series of internal grooves 508 that funnel into an array of external grooves 512. The internal grooves 508 are positioned on a top surface 514 and a bottom surface 516 of the internal cavity 504, and the top surface 514 and bottom surface 516 converge into the array of external grooves 512.

Each groove in the array of external grooves 512 is sized and shaped to receive a single wire from the twisted pairs of wires in the telecommunications cable 10. As described above, each wire from the twisted pairs of wires is guided by the gates 318 of the wire manager 300 into the load bar 500, and the internal grooves 508 positioned on the top surface 514 and the bottom surface 516 of the internal cavity 504 funnel the wires into the array of external grooves 512. In the example shown, the array of external grooves 512 are parallel and are arranged in the same vertical plane. In other examples, the array of external grooves 512 are vertically offset where, for example, a first row of external grooves is positioned in a first vertical plane and a second row of external grooves is positioned in a second vertical plane, and where the first vertical plane is different from the second vertical plane. Other configurations are possible.

When the modular plug 100 is assembled, the array of external grooves 512 is configured to position each wire from the twisted pairs of wires such that each wire is aligned with a wire contact 110. In the example shown, each groove in the array of external grooves 512 is exposed (e.g., uncovered) at the front portion of the load bar 500.

A crimping tool is used to crimp the wire contacts 110 into each wire positioned by the array of external grooves 512. In this manner, the modular plug 100 can field terminate the telecommunications cable 10 such that each wire contact 110 can electrically connect the twisted pairs of wires inside the cable to the contact springs of a telecommunications jack.

Figure 22:
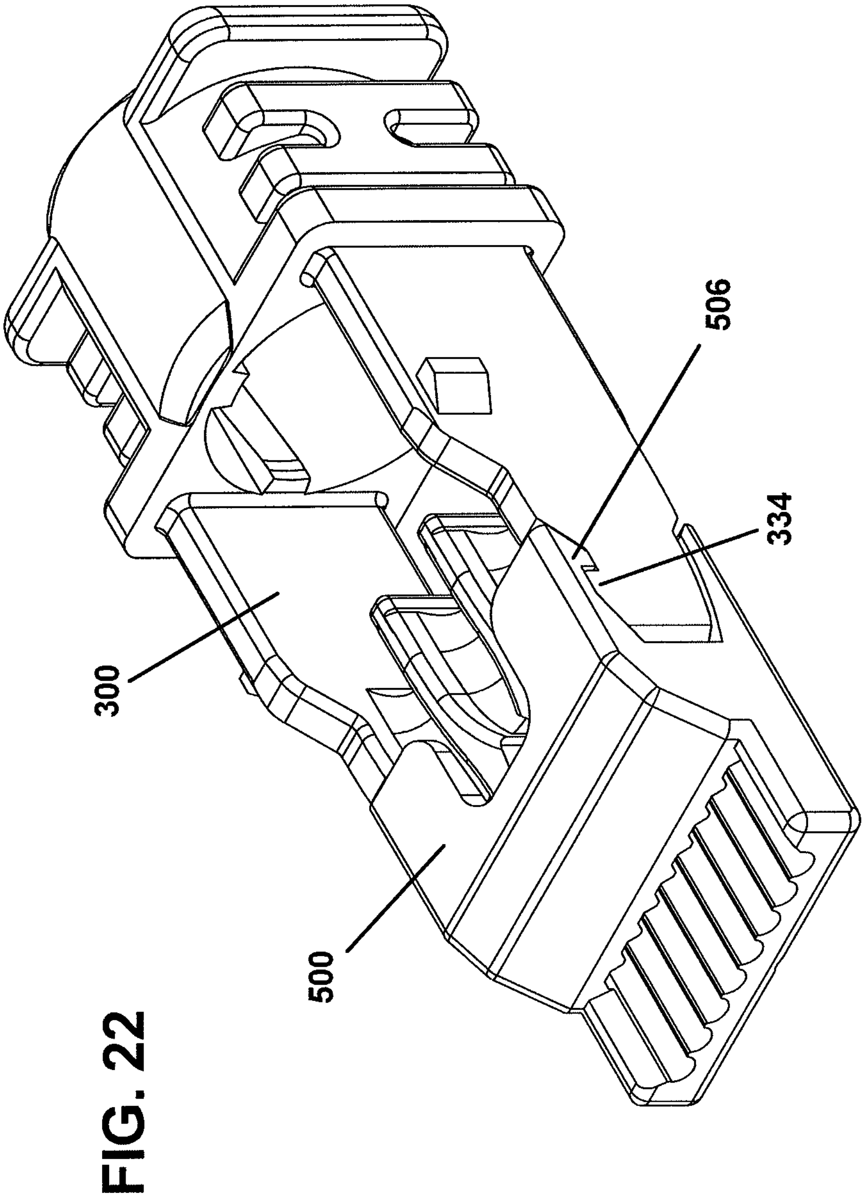
FIG. 22 is a perspective view of the load bar attached to the wire manager.

FIG. 22 is a perspective view of the load bar 500 attached to the wire manager 300. As shown in FIG. 22, the notches 506 of the load bar 500 latch onto the corresponding notches 334 of the wire manager 300. Accordingly, the load bar 500 snap-fits onto the wire manager 300.

Figure 23:
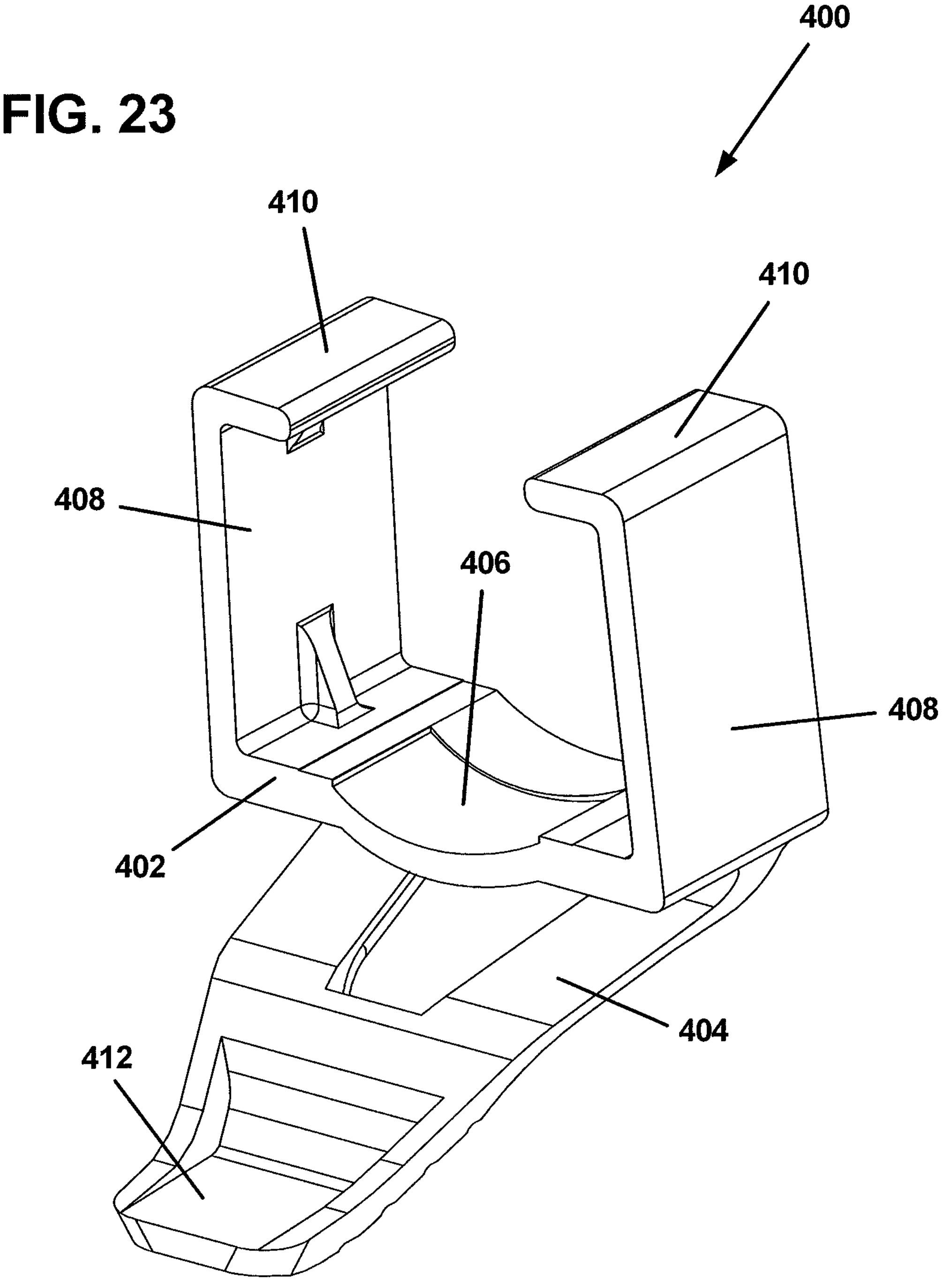
FIG. 23 is a perspective view of an anti-snag protector.

FIG. 23 is a perspective view of the anti-snag protector 400. The anti-snag protector 400 includes a base 402 and an arm 404 that extends therefrom. The base 402 includes a depression 406 that receives the form factor 304 of the wire manager 300 when the anti-snag protector 400 is attached to the wire manager 300. In some examples, the arm 404 includes a cavity 412 that is configured to receive a distal end of the latching handle 206 of the housing 200. The arm 404 functions to prevent the latching handle 206 from snagging or being snagged. The arm 404 may also function as an actuator for the latching handle 206 by transmitting pressure asserted onto the arm 404 to actuate the latching handle 206 to insert or remove the modular plug 100 from a telecommunications jack. Thus, the difficulty of actuating the latching handle 206 due to the relatively small size of the modular plug 100 is reduced or eliminated by the arm 404.

Figure 24:
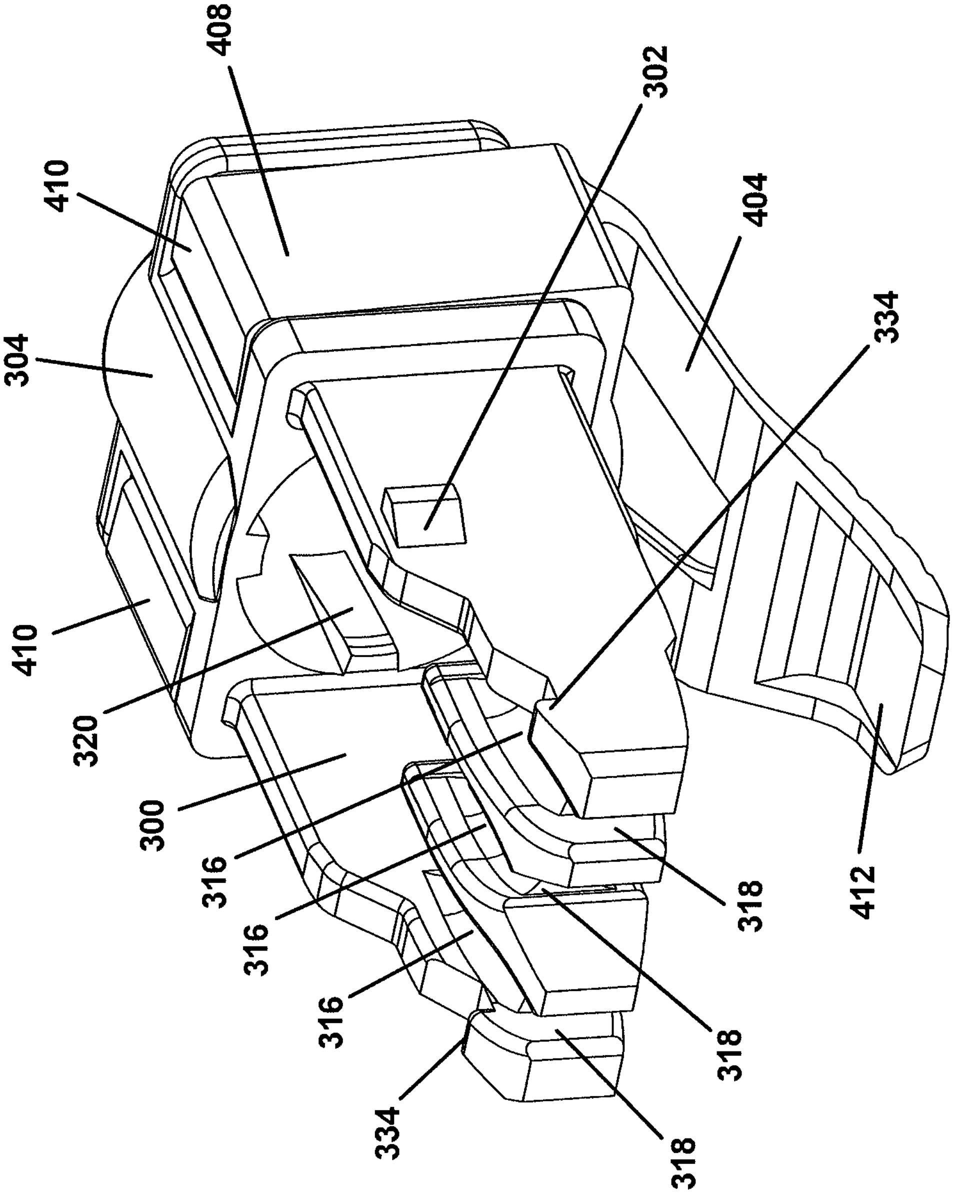
FIG. 24 is a perspective view of the anti-snag protector attached to the wire manager.

FIG. 24 is a perspective view of the anti-snag protector 400 attached to the wire manager 300. As shown in FIGS. 23 and 24, the anti-snag protector 400 includes sides 408 each extending outwardly from the base 402. Each side 408 includes a latching member 410 at a distal end thereof. The sides 408 are flexible such that the sides 408 are configured to flex around the rear portion 314 of the wire manager 300. Additionally, the latching members 410 are configured to engage the orthogonal edges 308 defined by the plurality of ribs 306 on the exterior surface of the rear portion 314 of the wire manager 300. Accordingly, the anti-snag protector 400 is configured to snap-fit onto the wire manager 300.

Figure 25:
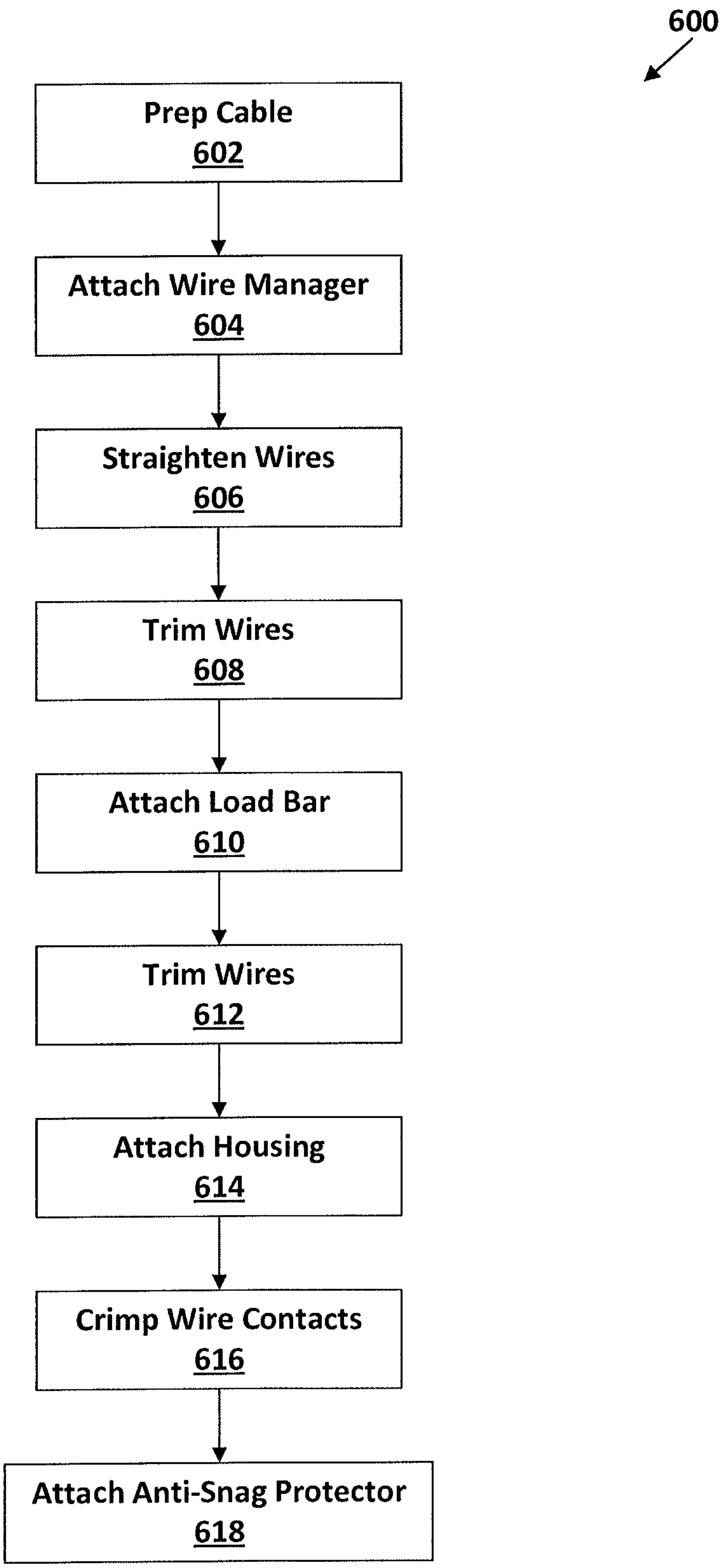
FIG. 25 shows a method of terminating a telecommunications cable with a modular plug.
Figure 26:
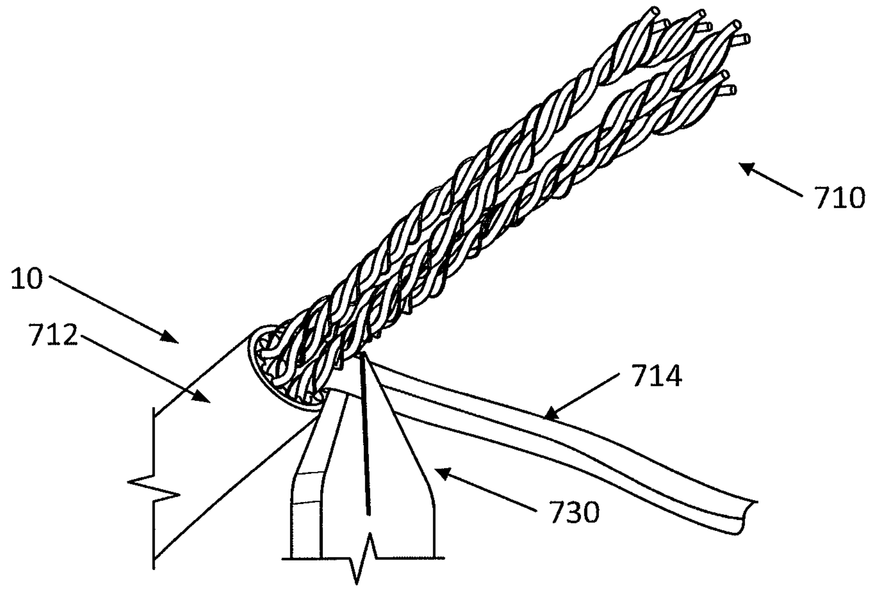
FIG. 26 shows an example preparation of the telecommunications cable.

FIG. 25 illustrates a method 600 of terminating a telecommunications cable 10 with the modular plug 100. The method 600 includes a step 602 of prepping the telecommunications cable 10. FIG. 26 shows an example preparation of the telecommunications cable 10. As shown in FIG. 26, a wire cutter 730 may be used to prep the telecommunications cable 10. In the example depicted, the telecommunications cable 10 includes four pairs of twisted wires 710 housed inside a protective outer jacket 712. Other configurations are possible. The step 602 can include removing or stripping a portion of the protective outer jacket 712 at the terminal end of the telecommunications cable 10 to expose the twisted pairs of wires 710. The step 602 may also include removing one or more internal protective layers (e.g., cross dividers, pair dividers, etc.), and breaking out the twisted pairs of wires 710 at the terminal end of the cable.

Figure 27:
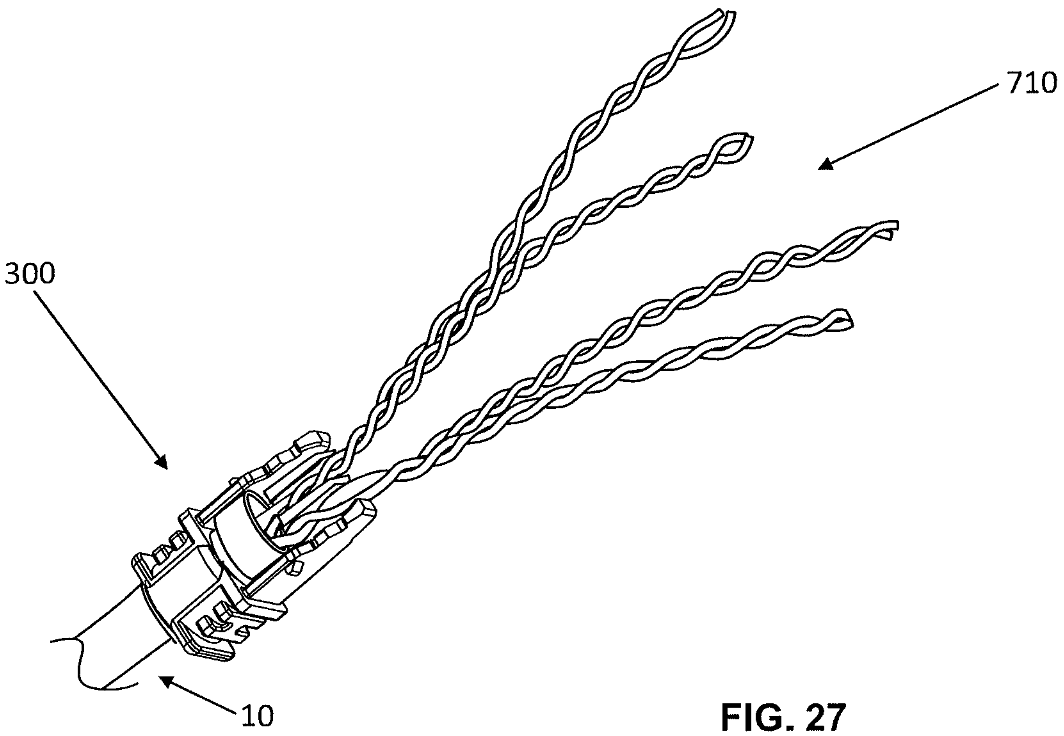
FIG. 27 shows an example wire manager attached to a terminal end of the telecommunications cable.
Figure 28:
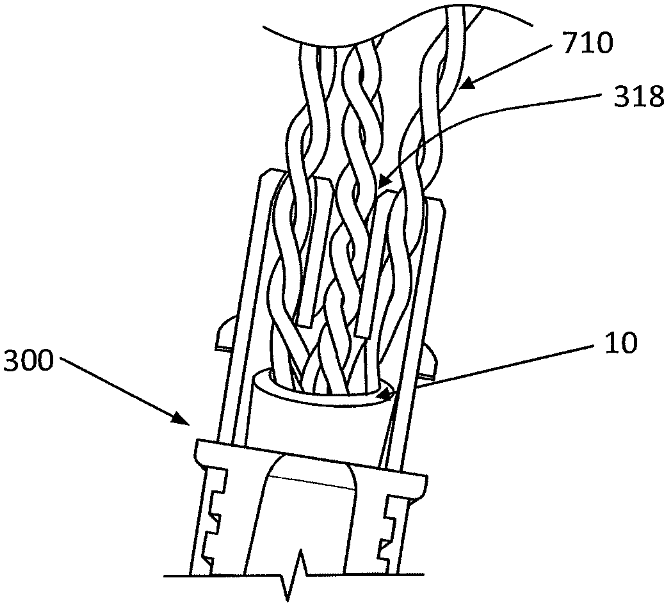
FIG. 28 shows another example of the wire manager attached to the terminal end of the telecommunications cable.

Next, the method 600 includes a step 604 of attaching the wire manager 300. FIGS. 27 and 28 show examples of the wire manager 300 attached to the terminal end of the telecommunications cable 10. As shown in FIGS. 27 and 28, the wire manager 300 is attached to the cable 10 by pushing the twisted pairs of wires 710 through the aperture 310 on the rear portion 314 of the wire manager 300, and through the channels 316 in the front portion 312 of the wire manager 300 until each twisted pair of wires exits a gate 318 of the wire manager 300.

Figure 29:
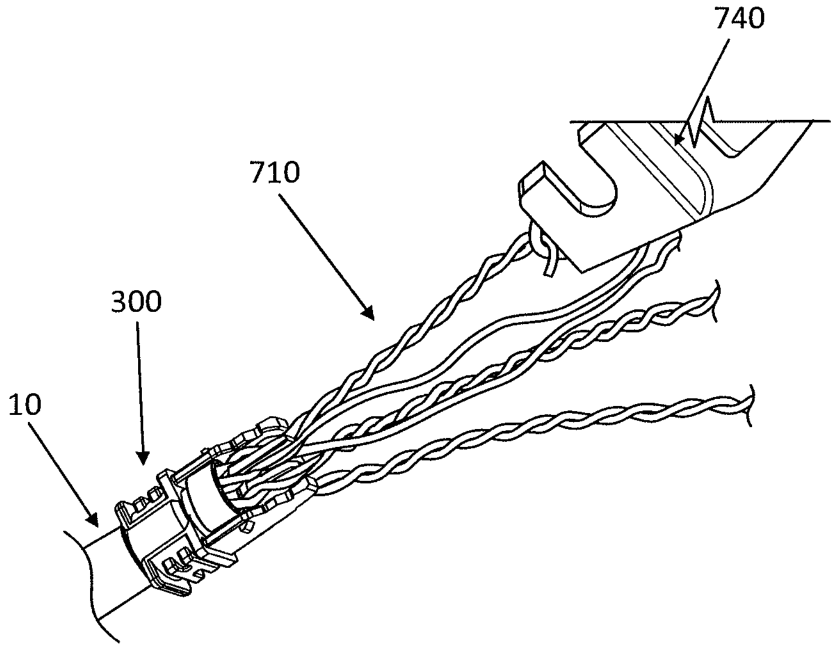
FIG. 29 shows an example tool used to straighten wires.
Figure 30:
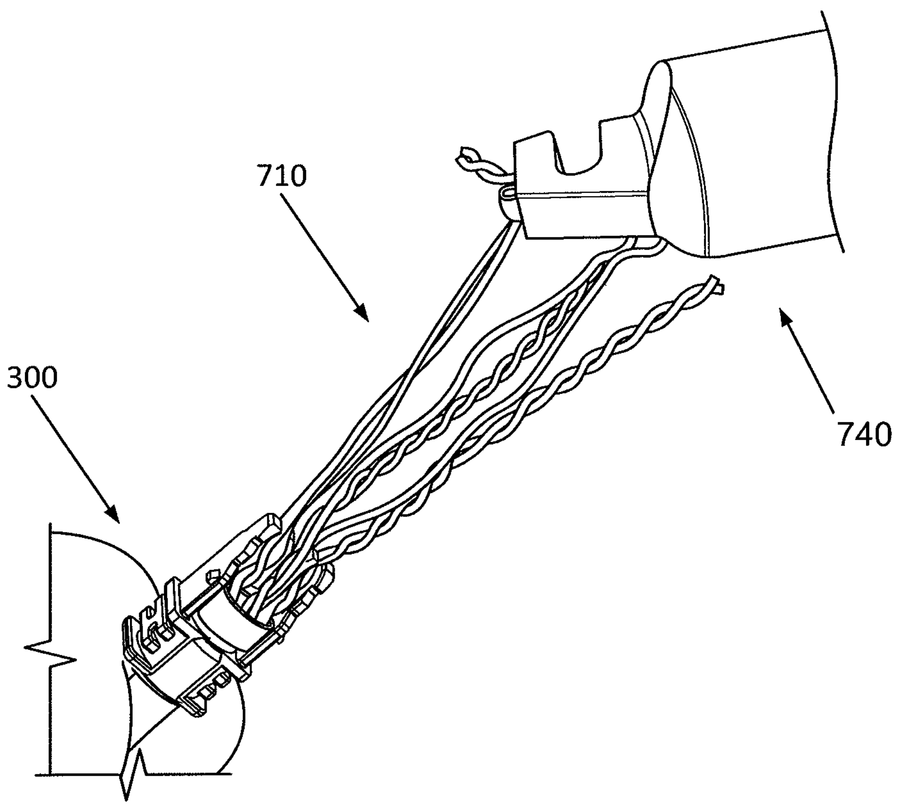
FIG. 30 shows the example tool used to straighten the wires.

The method 600 further includes a step 606 of straightening the wires 710. FIGS. 29 and 30 illustrate an example tool 740 that can be used to straighten the wires 710 after the wires exit the gates 318. In some examples, the tool 740 is a JacKnack tool or similar type of tool. As described above, the gates 318 can hold the twisted pairs of wires making it easier for a technician to untwist the wires after the wires exit the wire manager 300

FIG. 31 illustrates a detailed view of the straightened wires 710 exiting the gates 318 of the wire manager 300. As shown in FIG. 31, the offset of the gates 318 provides the extra space for a twisted pair of green and white wires to go around an adjacent pair of blue and white wires.

Figure 32:
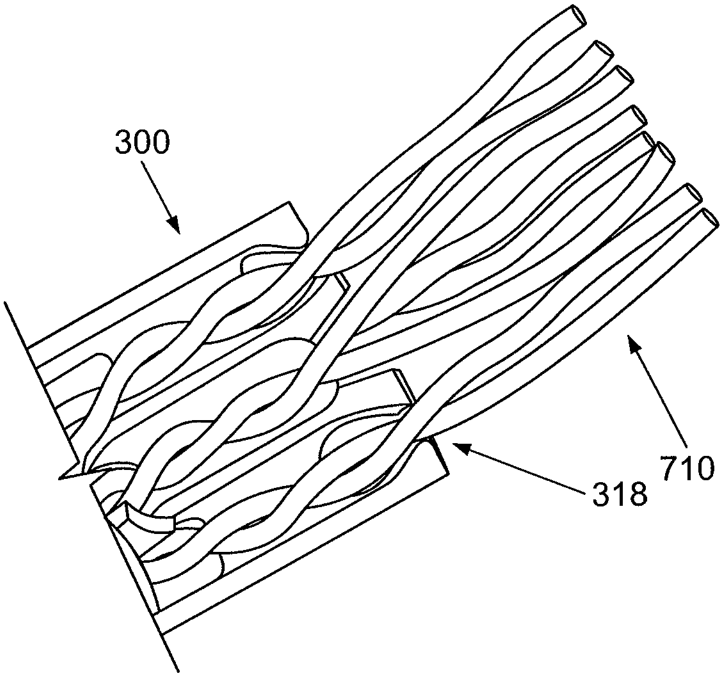
FIG. 32 shows the wires trimmed to have a predetermined length.

Next, the method 600 includes a step 608 of trimming the wires to have a predetermined length that extends outside the front portion of the wire manager 300. The wire cutter 730 is used to trim the wires. In some examples, the wires are trimmed to extend about ½ inch outside the gates 318 of the wire manager 300. FIG. 32 shows the wires after completion of step 608.

Figure 33:
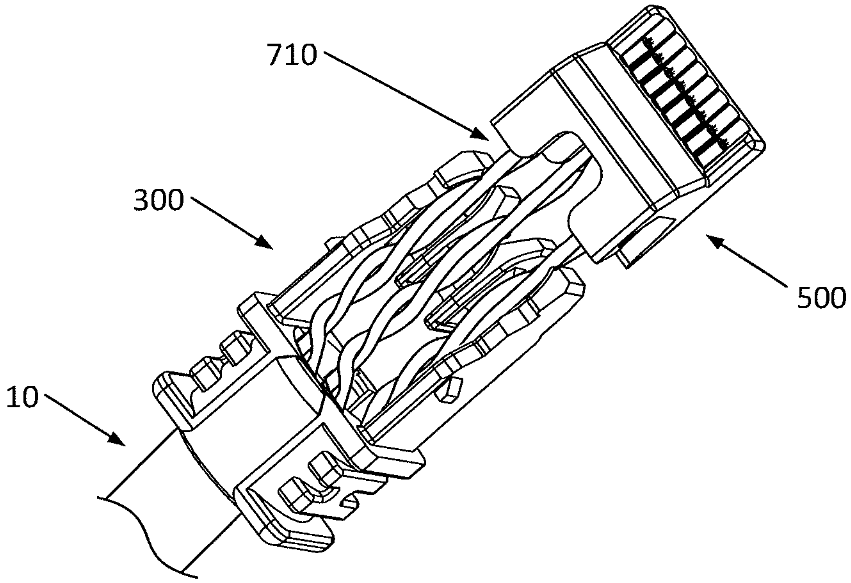
FIG. 33 shows the wires partially slid through the load bar.
Figure 34:
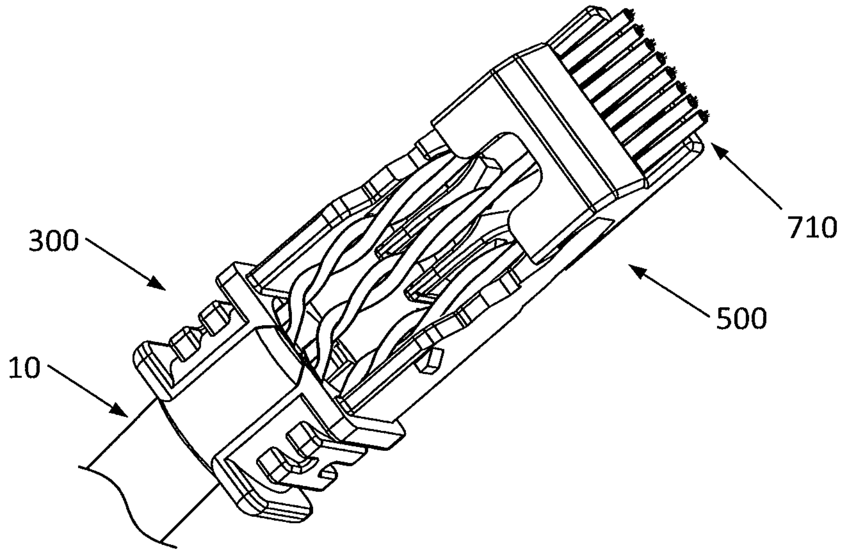
FIG. 34 shows the load bar attached to the wire manager.

Next, the method 600 includes a step 610 of sliding the load bar 500 onto the wires 710 and attaching the load bar 500 to the wire manager 300. FIG. 33 shows the wires partially slid through the load bar 500, and FIG. 34 shows the load bar 500 attached to the wire manager 300. As described above, the load bar 500 is configured to snap-fit onto the wire manager 300.

Figure 35:
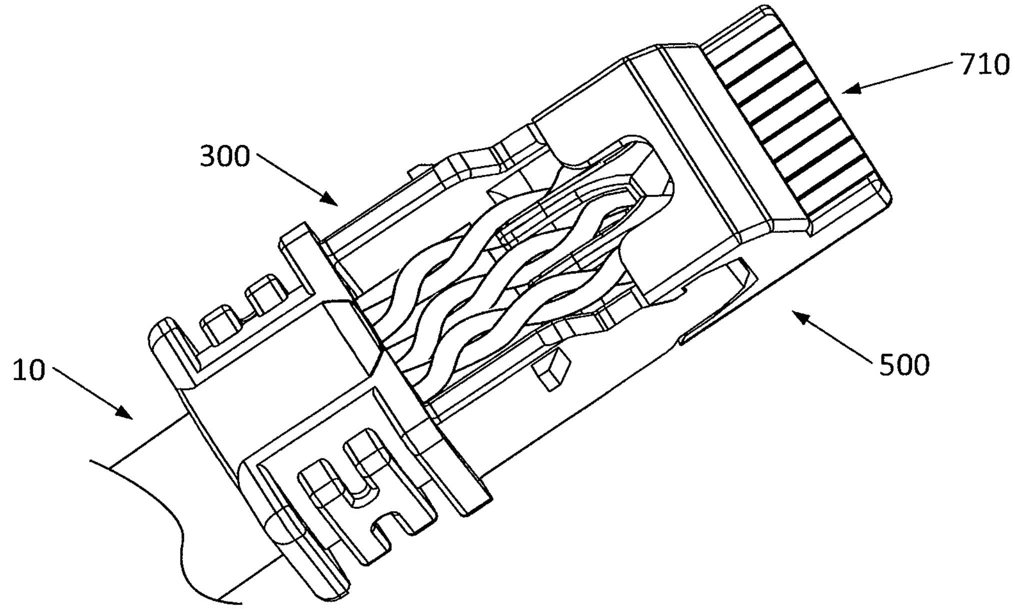
FIG. 35 shows the wires flush with the distal end of the load bar.

Next, the method 600 includes a step 612 of trimming the wires to be flush with the distal end of the load bar 500. The wire cutter 730 may be used to trim the wires. FIG. 35 shows the wires trimmed and flush with the distal end of the load bar 500.

Figure 36:
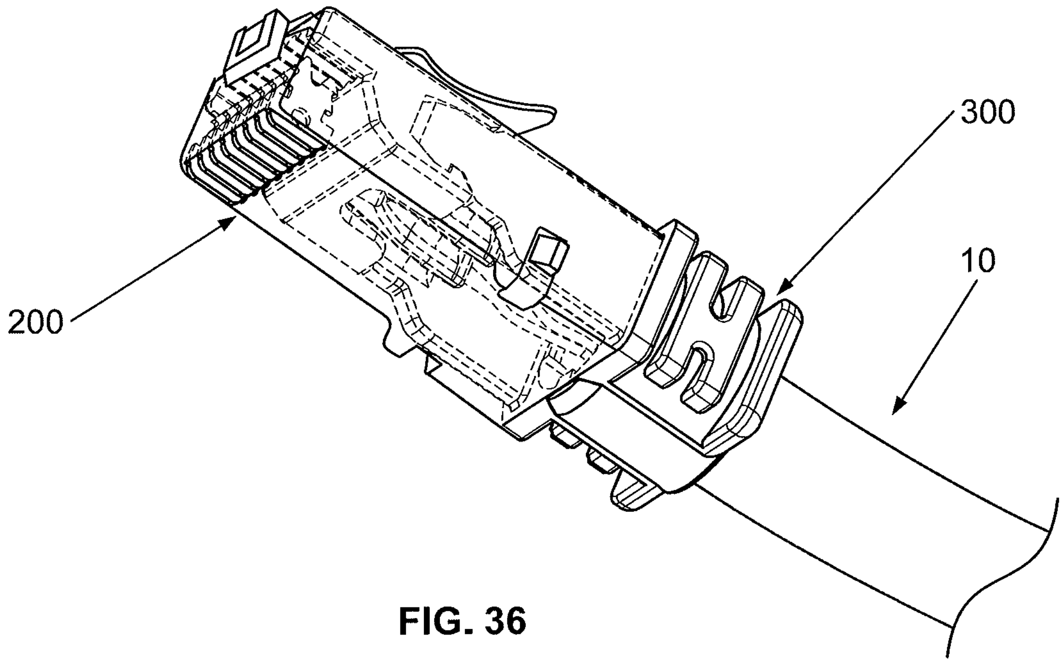
FIG. 36 shows the housing attached to the wire manager.

Next, the method 600 includes a step 614 of attaching the housing 200 to the wire manager 300. As described above, the wire manager 300 snap-fits into the housing 200. FIG. 36 shows the housing 200 attached to the wire manager 300.

Figure 37:
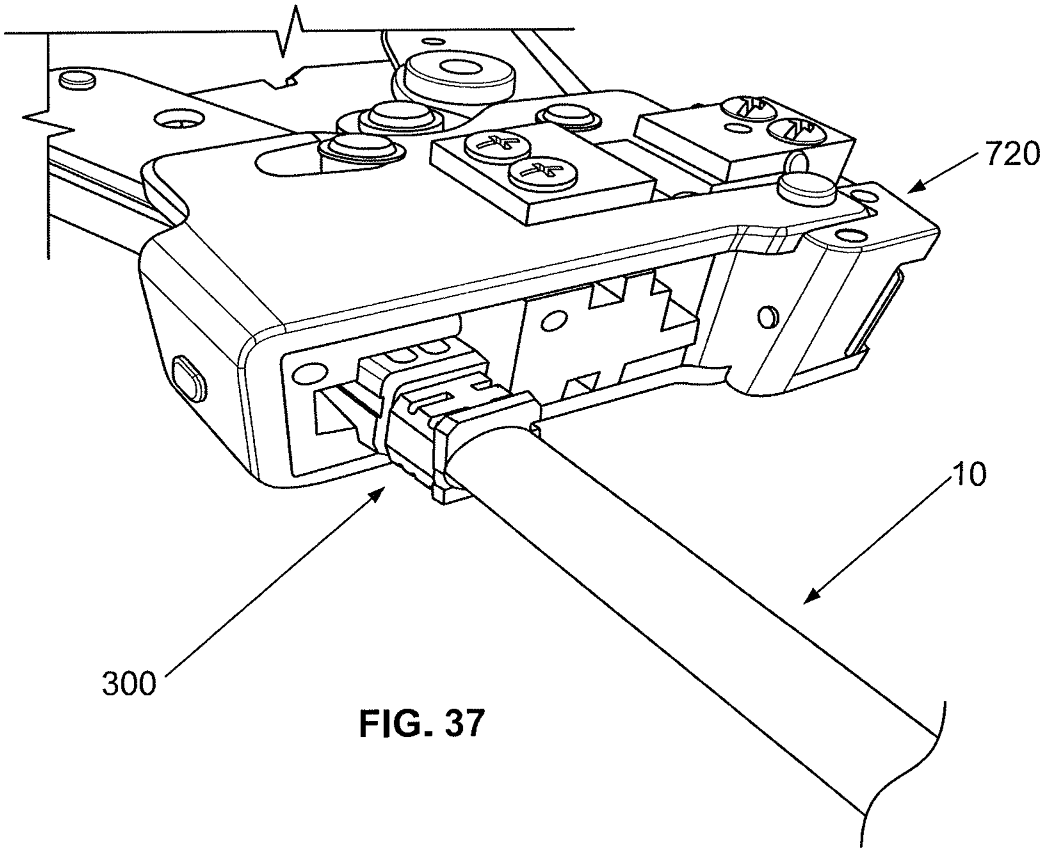
FIG. 37 shows a crimping tool used to crimp the wire contacts into the wires positioned by the load bar of the modular plug.

Next, the method 600 includes a step 616 of crimping the wire contacts housed inside the housing 200 to contact the wires received by the load bar 500. FIG. 37 shows a crimping tool 720 that can be used to crimp the wire contacts into the wires held by the load bar.

Figure 38:
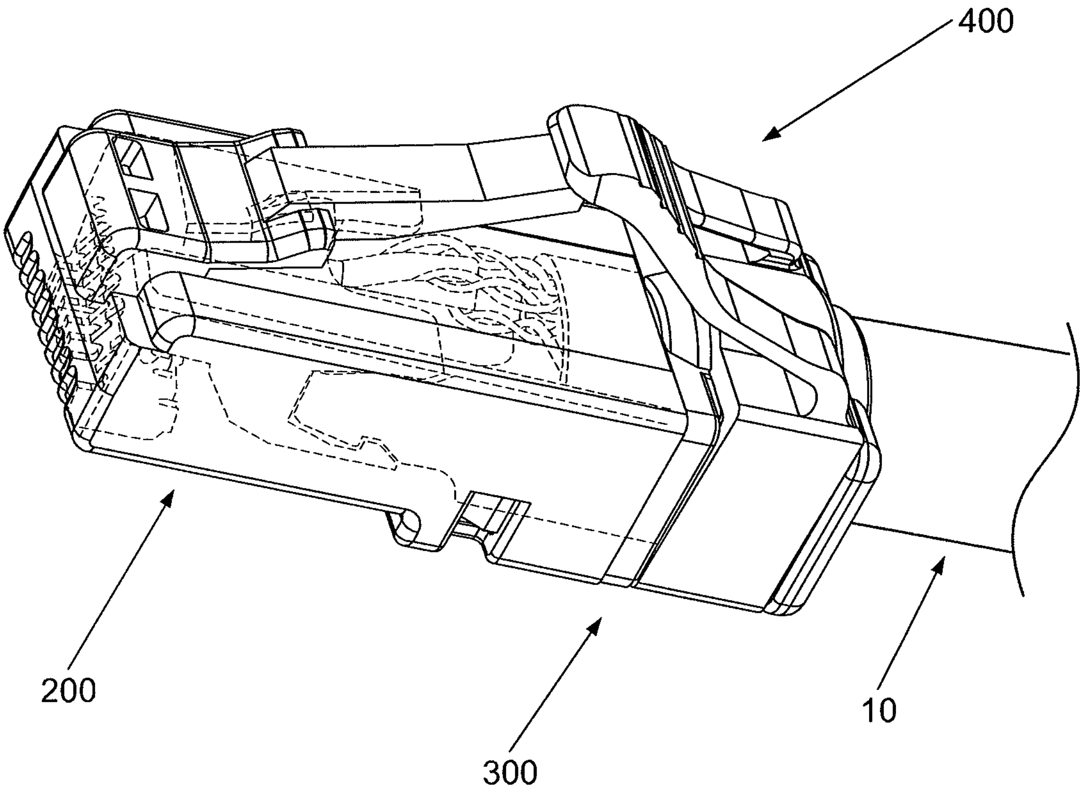
FIG. 38 shows the anti-snag protector attached to the wire manager.

Next, the method 600 includes a step 618 of attaching the anti-snag protector 400 to the wire manager 300. As described above, the anti-snag protector 40 snap-fits onto the wire manager 300. FIG. 38 shows the anti-snag protector 400 attached to the wire manager 300.

The various embodiments described above are provided by way of illustration only and should not be construed to limit the claims attached hereto. Those skilled in the art will readily recognize various modifications and changes that may be made without following the example embodiments and application illustrated and described herein, and without departing from the true spirit and scope of the following claims.

What is claimed is:

1. A modular plug for terminating a telecommunications cable, the modular plug comprising:

a housing defining an internal cavity;

a wire manager fitted within the internal cavity of the housing and extending along a long axis between a rear portion that is configured to receive a terminal end of the telecommunications cable and a front portion that is received inside the internal cavity of the housing, the wire manager having a plurality of channels, each channel having a gate configured to position a twisted pair of wires from the telecommunications cable, and each gate on the wire manager includes opposing surfaces that diverge in a direction of the front portion for guiding a wire from the twisted pair of wires toward a load bar fitted within the internal cavity of the housing, the load bar defining an array of external grooves, each external groove being configured to receive a wire from each twisted pair of wires; and a plurality of wire contacts aligned with the array of external grooves.

2. The modular plug of claim 1, wherein the load bar includes an internal cavity having a top surface and a bottom surface that converge into the array of external grooves.

3. The modular plug of claim 2, wherein the top surface and the bottom surface of the internal cavity each include a series of internal grooves that funnel into the array of external grooves.

4. The modular plug of claim 1, wherein the array of external grooves on the load bar are parallel and are arranged in the same vertical plane.

5. The modular plug of claim 1, wherein the load bar is configured to snap-fit onto the front portion of the wire manager.

6. The modular plug of claim 1, wherein the load bar includes notches configured to latch onto corresponding notches on the front portion of the wire manager.

7. The modular plug of claim 1, wherein the gates are offset along the long axis of the wire manager.

8. The modular plug of claim 1, wherein the wire manager defines three columns and two rows of channels.

9. The modular plug of claim 1, wherein the front portion of the wire manager is tapered and is configured to pinch the twisted pairs of wires.

10. The modular plug of claim 1, wherein the front portion of the wire manager includes tabs configured to snap-fit into corresponding slots on the housing.

11. The modular plug of claim 1, wherein the rear portion has an aperture configured to receive the terminal end of the telecommunications cable, the rear portion having a plurality of ribs that define orthogonal edges on exterior surfaces of the wire manager, and the orthogonal edges being configured to receive an anti-snag protector.

12. The modular plug of claim 11, wherein the aperture on the rear portion of the wire manager includes a form factor configured to fit around the shape of the telecommunications cable, the form factor having ribs that define an internal circumference inside the aperture of the wire manager that is configured to grip a jacket of the telecommunications cable.

13. The modular plug of claim 1, wherein the housing includes an array of slots along a leading edge of a first end of the housing, each wire contact is received by a slot of the housing and is configured to electrically connect the twisted pairs of wires in the telecommunications cable to contact springs of a telecommunications jack.

14. The modular plug of claim 1, wherein the housing includes a latching handle configured to secure the modular plug to a receptacle.

15. The modular plug of claim 14, further comprising an anti-snag protector that attaches to the wire manager, the anti-snag protector having an arm that extends from a base, the arm being configured to prevent the latching handle from being snagged.

16. The modular plug of claim 15, wherein the base includes a depression configured to receive a form factor of the aperture on the rear portion of the wire manager.

17. The modular plug of claim 15, wherein the anti-snag protector is configured to snap-fit onto the rear portion of the wire manager.

18. The modular plug of claim 15, wherein the anti-snag protector includes sides each extending outwardly from the base and each having a latching member at a distal end, the sides being configured to flex around the rear portion of the wire manager and the latching members being configured to engage orthogonal edges on the rear portion of the wire manager.

19. The modular plug of claim 1, wherein the gates have a smallest dimension that is less than twice the diameter of a single wire from each twisted pair of wires.

20. The modular plug of claim 1, wherein each gate is configured to hold a twisted pair of wires from the telecommunications cable in a stacked vertical arrangement.

21. A method of terminating a telecommunications cable with a modular plug, the method comprising:

attaching a wire manager to a terminal end of the telecommunications cable, the wire manager extending along a long axis between a rear portion that receives the terminal end of the telecommunications cable and a front portion;

using gates on the wire manager to hold twisted pairs of wires from the telecommunications cable;

straightening the twisted pairs of wires;

using opposing surfaces on each gate of the wire manager to guide a wire from each twisted pair of wires into an internal cavity of a load bar, the opposing surfaces diverging in a direction of the front portion of the wire manager;

sliding the load bar onto the straightened wires;

trimming the straightened wires to be flush with a distal end of the load bar;

attaching a housing to the wire manager; and crimping wire contacts housed inside the housing to contact the wires.

22. The method of claim 21, further comprising:

attaching an anti-snag protector to the wire manager.

23. The method of claim 21, further comprising:

trimming the wires to have a predetermined length that extends outside a front portion of the wire manager.

24. The method of claim 21, further comprising:

attaching the load bar to the wire manager.

25. A modular plug for terminating a telecommunications cable, the modular plug comprising:

a housing defining an internal cavity;

a wire manager fitted within the internal cavity of the housing and having a plurality of channels, each channel having a gate configured to position a twisted pair of wires from the telecommunications cable, the wire manager including a rear portion having an aperture configured to receive a terminal end of the telecommunications cable, the rear portion having a plurality of ribs that define orthogonal edges on exterior surfaces of the wire manager, and the orthogonal edges being configured to receive an anti-snag protector;

a load bar fitted within the internal cavity of the housing, the load bar defining an array of external grooves, each external groove being configured to receive a wire from each twisted pair of wires; and a plurality of wire contacts aligned with the array of external grooves.

26. The modular plug of claim 25, wherein the aperture on the rear portion of the wire manager includes a form factor configured to fit around the shape of the telecommunications cable, the form factor having ribs that define an internal circumference inside the aperture of the wire manager that is configured to grip a jacket of the telecommunications cable.

* * * * *